(12) United States Patent
Kamath et al.

(10) Patent No.: US 12,524,035 B2
(45) Date of Patent: Jan. 13, 2026

(54) NP5 FRACTIONAL CLOCK DIVIDER

(71) Applicant: QUALCOMM Incorporated, San Diego, CA (US)

(72) Inventors: Harsha Kamath, Bengaluru (IN); Neha Agrawal, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 110 days.

(21) Appl. No.: 18/485,032

(22) Filed: Oct. 11, 2023

(65) Prior Publication Data
US 2025/0123650 A1 Apr. 17, 2025

(51) Int. Cl.
*G06F 1/00* (2006.01)
*G06F 1/08* (2006.01)

(52) U.S. Cl.
CPC .................. *G06F 1/08* (2013.01)

(58) Field of Classification Search
CPC .......... G06F 1/08; H03K 21/00; H03K 21/02; H03K 21/026; H03K 21/08; H03K 21/10; H03K 23/00; H03K 23/40; H03K 23/42; H03K 23/425; H03K 23/54; H03K 23/58
See application file for complete search history.

(56) References Cited

U.S. PATENT DOCUMENTS

| | | | | |
|---|---|---|---|---|
| 6,356,123 B1* | 3/2002 | Lee | ........................ | H03K 5/13 377/122 |
| 7,012,455 B2* | 3/2006 | Chen | ..................... | H03K 23/546 327/117 |
| 8,471,607 B1* | 6/2013 | Pace | ..................... | H03K 21/026 327/117 |
| 9,543,960 B1* | 1/2017 | He | ......................... | H03K 21/10 |
| 10,972,112 B1* | 4/2021 | Zhang | ..................... | H03K 23/70 |
| 11,271,550 B1* | 3/2022 | Kossel | ..................... | H03K 21/10 |
| 2005/0174153 A1* | 8/2005 | Saeki | .................... | H03L 7/1974 327/117 |
| 2009/0067567 A1 | 3/2009 | Liu | | |
| 2012/0313674 A1 | 12/2012 | Malmcrona et al. | | |
| 2013/0214826 A1* | 8/2013 | Dahan | ................. | H03K 23/662 327/115 |

FOREIGN PATENT DOCUMENTS

| | | |
|---|---|---|
| CA | 2538959 A1 | 9/2007 |
| EP | 1562294 A1 | 8/2005 |

OTHER PUBLICATIONS

Partial International Search Report—PCT/US2024/045623—ISA/EPO—Dec. 18, 2024.
Cheung T.H., et al., "A 5.4-GHz 2/3/4-Modulus Fractional Frequency Divider Circuit in 28-nm CMOS", 2019 IEEE International Symposium on Circuits and Systems (ISCAS), IEEE, May 22, 2021, 5 Pages, XP033933696, section III., figure 2.
International Search Report and Written Opinion—PCT/US2024/045623—ISA/EPO—Mar. 21, 2025.

\* cited by examiner

*Primary Examiner* — Tuan T Lam
(74) *Attorney, Agent, or Firm* — Loza & Loza, LLP

(57) ABSTRACT

An apparatus, including: a clock source configured to generate first and second clock signals based on an input clock signal, wherein each of the first and second clock signals has a frequency being substantially a frequency of the input clock signal divided by 2N+1, where N is an integer; and a logic circuit configured to perform a logic operation on the first and second clock signals to generate an output clock signal with a frequency being substantially the frequency of the input clock signal divided by NP5, where P5 is a half fraction.

24 Claims, 9 Drawing Sheets

| Mod- 15 Counter ||||||||
|---|---|---|---|---|---|---|---|
| Present State |||| Next state ||||
| $f_3$ | $f_2$ | $f_1$ | $f_0$ | $dff_3$ | $dff_2$ | $dff_1$ | $dff_0$ |
| 0 | 0 | 0 | 0 | 0 | 0 | 0 | 1 |
| 0 | 0 | 0 | 1 | 0 | 0 | 1 | 0 |
| 0 | 0 | 1 | 0 | 0 | 0 | 1 | 1 |
| 0 | 0 | 1 | 1 | 0 | 1 | 0 | 0 |
| 0 | 1 | 0 | 0 | 0 | 1 | 0 | 1 |
| 0 | 1 | 0 | 1 | 0 | 1 | 1 | 0 |
| 0 | 1 | 1 | 0 | 0 | 1 | 1 | 1 |
| 0 | 1 | 1 | 1 | 1 | 0 | 0 | 0 |
| 1 | 0 | 0 | 0 | 1 | 0 | 0 | 1 |
| 1 | 0 | 0 | 1 | 1 | 0 | 1 | 0 |
| 1 | 0 | 1 | 0 | 1 | 0 | 1 | 1 |
| 1 | 0 | 1 | 1 | 1 | 1 | 0 | 0 |
| 1 | 1 | 0 | 0 | 1 | 1 | 0 | 1 |
| 1 | 1 | 0 | 1 | 1 | 1 | 1 | 0 |
| 1 | 1 | 1 | 0 | 0 | 0 | 0 | 0 |

| $dff_3$ | $(f_3 \& f_{1b})+(f_1 \& f_3 \& f_{2b})$ <br> $+ (f_1 \& f_0 \& f_{3b} \& f_2)$ ||||
|---|---|---|---|---|
| $f_3f_2/f_1f_0$ | 00 | 01 | 11 | 10 |
| 00 | 0 | 0 | 0 | 0 |
| 01 | 0 | 0 | 1 | 0 |
| 11 | 1 | 1 | X | 0 |
| 10 | 1 | 1 | 1 | 1 |

| $dff_1$ | $(f_{1b} \& f_0)+$ <br> $(f_1 \& f_{0b} \& (f_{2b}+f_{3b} \& f_2))$ ||||
|---|---|---|---|---|
| $f_3f_2/f_1f_0$ | 00 | 01 | 11 | 10 |
| 00 | 0 | 1 | 0 | 1 |
| 01 | 0 | 1 | 0 | 1 |
| 11 | 0 | 1 | X | 0 |
| 10 | 0 | 1 | 0 | 1 |

| $dff_2$ | $(f_2 \& f_{1b})+(f_1 f_0 f_{2b})+(f_1 f_{0b} f_{3b} f_2)$ ||||
|---|---|---|---|---|
| $f_3f_2/f_1f_0$ | 00 | 01 | 11 | 10 |
| 00 | 0 | 0 | 1 | 0 |
| 01 | 1 | 1 | 0 | 1 |
| 11 | 1 | 1 | X | 0 |
| 10 | 0 | 0 | 1 | 0 |

| $dff_0$ | $(f_{1b} \& f_{0b})+$ <br> $(f_1 \& f_{0b} \& (f_{2b}+f_{3b} \& f_2))$ ||||
|---|---|---|---|---|
| $f_3f_2/f_1f_0$ | 00 | 01 | 11 | 10 |
| 00 | 1 | 0 | 0 | 1 |
| 01 | 1 | 0 | 0 | 1 |
| 11 | 1 | 0 | X | 0 |
| 10 | 1 | 0 | 0 | 1 |

FIG. 7B

NP5 FRACTIONAL CLOCK DIVIDER

FIELD

Aspects of the present disclosure relate generally to clock frequency dividers, and in particular, to an NP5 fractional clock divider, where N is an integer and P5 is a half (0.5) fraction.

BACKGROUND

Data communication links, such as serializer/deserializer (SERDES) links, are used to communicate data/clock signals between integrated circuits (ICs) and/or other components. As mentioned, clock signals are used to transfer data per such SERDES communication links. Some clock signals (with relatively high frequencies) are used to control the rate at which the data is transferred. Other clock signals (with relatively low frequencies) may be used to control the operations pursuant to the transfer of data. Frequency dividers may be provided in such SERDES communication links to frequency divide the clock signals used to control the data rate to generate the lower-frequency clock signals for controlling the data transfer operations.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

An aspect of the disclosure relates to an apparatus. The apparatus includes: a clock source configured to generate first and second clock signals based on an input clock signal, wherein each of the first and second clock signals has a frequency being substantially a frequency of the input clock signal divided by 2N+1, where N is an integer; and a logic gate configured to perform a logic operation on the first and second clock signals to generate an output clock signal with a frequency being substantially the frequency of the input clock signal divided by NP5, where P5 is a half fraction.

Another aspect of the disclosure relates to a method. The method includes generating first and second clock signals based on an input clock signal, wherein each of the first and second clock signals has a frequency being substantially a frequency of the input clock signal divided by 2N+1, where N is an integer; and performing a logic operation on the first and second clock signals to generate an output clock signal with a frequency being substantially the frequency of the input clock signal divided by NP5, where P5 is a half fraction.

Another aspect of the disclosure relates to an apparatus. The apparatus includes: means for generating first and second clock signals based on an input clock signal, wherein each of the first and second clock signals has a frequency being substantially a frequency of the input clock signal divided by 2N+1, where N is an integer; and means for performing a logic operation on the first and second clock signals to generate an output clock signal with a frequency being substantially the frequency of the input clock signal divided by NP5, where P5 is a half fraction.

Another aspect of the disclosure relates to an apparatus. The apparatus includes: a clock source including an input configured to generate first and second clock signals based on an input clock signal; and a logic circuit including first and second inputs coupled to first and second outputs of the clock source, respectively, and an output configured to generate an output clock signal with a frequency being substantially a frequency of the input clock signal divided by NP5, where N is an integer and P5 is a half fraction.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the description implementations are intended to include all such aspects and their equivalents.

BRIEF DESCRIPTION OF THE DRAWINGS

FIG. 7B illustrates example truth table and Karnaugh maps associated with the 2N+1 modulo counter of FIG. 7A in accordance with another aspect of the disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
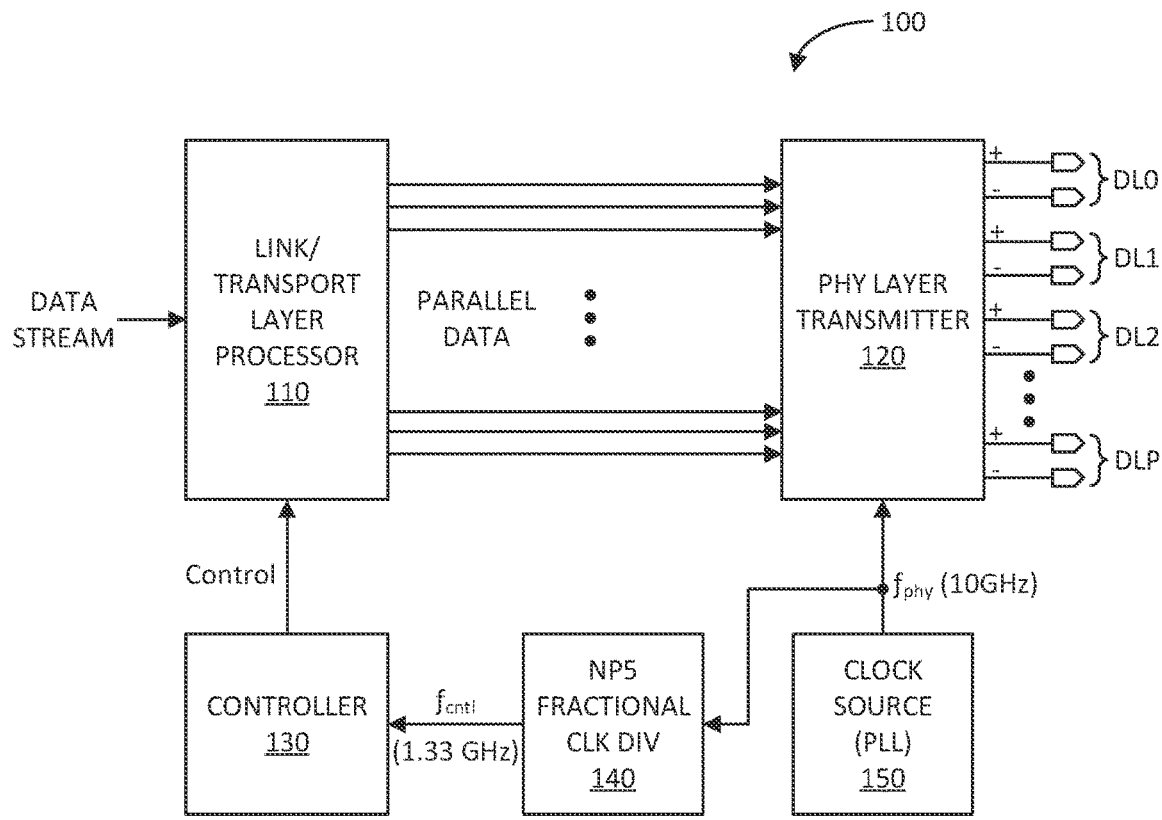
FIG. 1 illustrates a block diagram of an example data communication interface in accordance with an aspect of the disclosure.

FIG. 1 illustrates a block diagram of an example data communication interface 100 in accordance with an aspect of the disclosure. The data communication interface 100 may be a transmitter of a serializer-deserializer (SERDES) data communication interface. For example, the data communication interface 100 may be implemented as a DisplayPort 2.0 (DP 2.0) or other version or protocol for transmitting data to one or more target (destination) devices (not shown).

In particular, the data communication interface 100 includes a link/transport layer processor 110, a physical ("phy") layer transmitter 120, a controller 130, a clock source 150 (which may be based on a phase lock loop (PLL) implementation), and an NP5 fractional clock divider 140.

The link/transport layer processor 110 may receive a stream of data (e.g., multimedia data, such as video and/or audio data), and perform link and/or transport layer processing (e.g., higher than phy layer processing) on the stream of data to generate a set of parallel data. The phy layer transmitter 120 receives and serializes the parallel data for differential data transmission to one or more target devices via a set of one or more data lanes (DL) DL0 to DLP, where P is an integer. In accordance with DP 2.0 protocol, for example, the phy layer transmitter may transmit the data via the set of one or more data lanes DL0 to DLP at a double data rate (DDR) of substantially 20 giga Hertz (GHz) based on a clock signal $f_{phy}$ with a frequency of substantially 10 GHz generated by the clock source 150. It shall be understood that the frequencies and other parameters described herein with specified numbers or variables are substantially those numbers or variables, but due to tolerances and/or non-ideal behavior, the frequencies and other parameters may vary slightly from what is specified.

The controller 130, which controls various operations of the data communication interface 100, such as the clocking out of the parallel data from the link/transport layer processor 110 to the phy layer transmitter 120 (as well as other operations), uses a clock signal $f_{cntl}$ with a frequency of substantially 1.33 GHZ. The lower frequency clock signal $f_{cntl}$ may be generated by the NP5 fractional clock divider 140 by frequency dividing the clock signal $f_{phy}$ (e.g., 10 GHz) by a divider ratio of substantially 7.5 to generate the clock signal $f_{cntl}$ (e.g., 1.33 GHZ). Thus, the "N" in the term "NP5" stands for the integer part of the divider ratio ($f_{phy}/f_{cntl}$), and "P5" stands for the fractional (e.g., half) part of the divider ratio. In the examples provided herein, the integer N is seven (7), but it could any other integer.

Figure 2A:
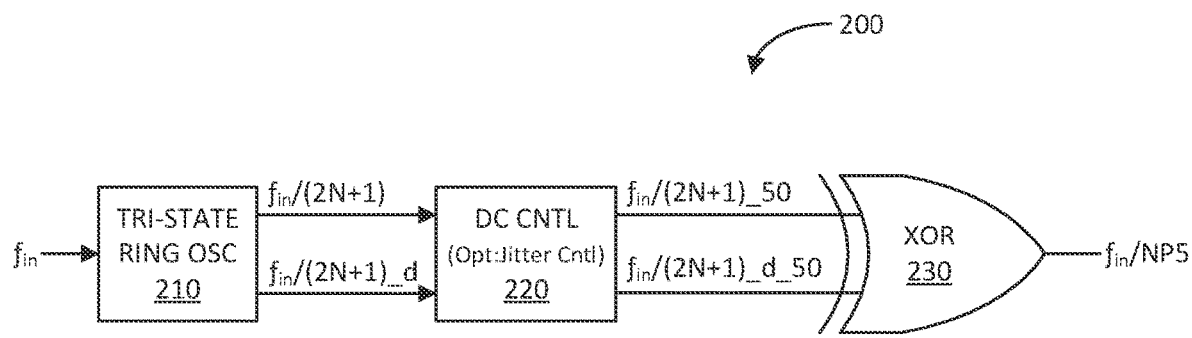
FIG. 2A illustrates a block diagram of an example NP5 fractional clock divider in accordance with another aspect of the disclosure.

FIG. 2A illustrates a block diagram of an example NP5 fractional clock divider 200 in accordance with another aspect of the disclosure. The NP5 fractional clock divider 200 may be an example implementation of the NP5 fractional clock divider 140 of data communication interface 100. In particular, the NP5 fractional clock divider 200 includes a tri-state ring oscillator (RO) 210, a duty cycle (DC) control circuit 220 (with optional jitter control), and a logic circuit, such as an exclusive-OR (XOR) gate 230.

The tri-state RO 210 is configured to receive an input clock signal $f_{in}$, and generate a first set of intermediate clock signals $f_{in}/(2N+1)$ and $f_{in}/(2N+1)\_d$ based on the input clock signal $f_{in}$. With regard to the data communication interface 100, the input clock signal $f_{in}$ may be the phy layer clock signal $f_{phy}$ generated by the clock source 150. The intermediate clock signal $f_{in}/(2N+1)$ has a frequency being substantially the frequency of the input clock signal $f_{in}$ divided by 2N+1. For example, if N=7, then the intermediate clock signal $f_{in}/(2N+1)$ has a frequency being substantially the frequency of the input clock signal $f_{in}$ divided by 15. The intermediate clock signal $f_{in}/(2N+1)\_d$ has substantially the same frequency as the intermediate clock signal $f_{in}/(2N+1)$, but is shifted in phase with respect to the intermediate clock signal $f_{in}/(2N+1)$ by substantially $\Delta\phi=(N+1)/2 f_{in}$ if N is odd or $\Delta\phi=(N)/2f_{in}$ if N is even.

The first set of intermediate clock signals $f_{in}/(2N+1)$ and $f_{in}/(2N+1)\_d$ may each have a duty cycle of $N/(2N+1)$, with a first phase (e.g., a logic high phase) spanning N cycles of the input clock signal $f_{in}$ and a second phase (e.g., a logic low phase) spanning N+1 cycles of the input clock signal $f_{in}$. Accordingly, the duty cycle control circuit 220 is configured to receive the first set of intermediate clock signals $f_{in}/(2N+1)$ and $f_{in}/(2N+1)\_d$, and control/adjust their duty cycle to generate a second set of intermediate signals $f_{in}/(2N+1)\_50$ and $f_{in}/(2N+1)\_d\_50$ each with substantially 50 percent (%) duty cycle. The logic circuit 230 is configured to receive and perform a logic operation (e.g., an XOR operation) to double the frequency of the second set of intermediate clock signals $f_{in}/(2N+1)\_50$ and $f_{in}/(2N+1)\_d\_50$ to generate the output (NP5 divided) clock signal $f_{in}/NP5$. With reference to the data communication interface 100, the NP5 divided clock signal $f_{in}/NP5$ may be the controller clock signal $f_{cntl}$. In an alternative implementation, the first set of intermediate clock signals $f_{in}/(2N+1)$ and $f_{in}/(2N+1)\_d$ may each have a duty cycle of $N+1/(2N+1)$, with a first phase (e.g., a logic high phase) spanning N+1 cycles of the input clock signal $f_{in}$ and a second phase (e.g., a logic low phase) spanning N cycles of the input clock signal $f_{in}$.

Figure 2B:
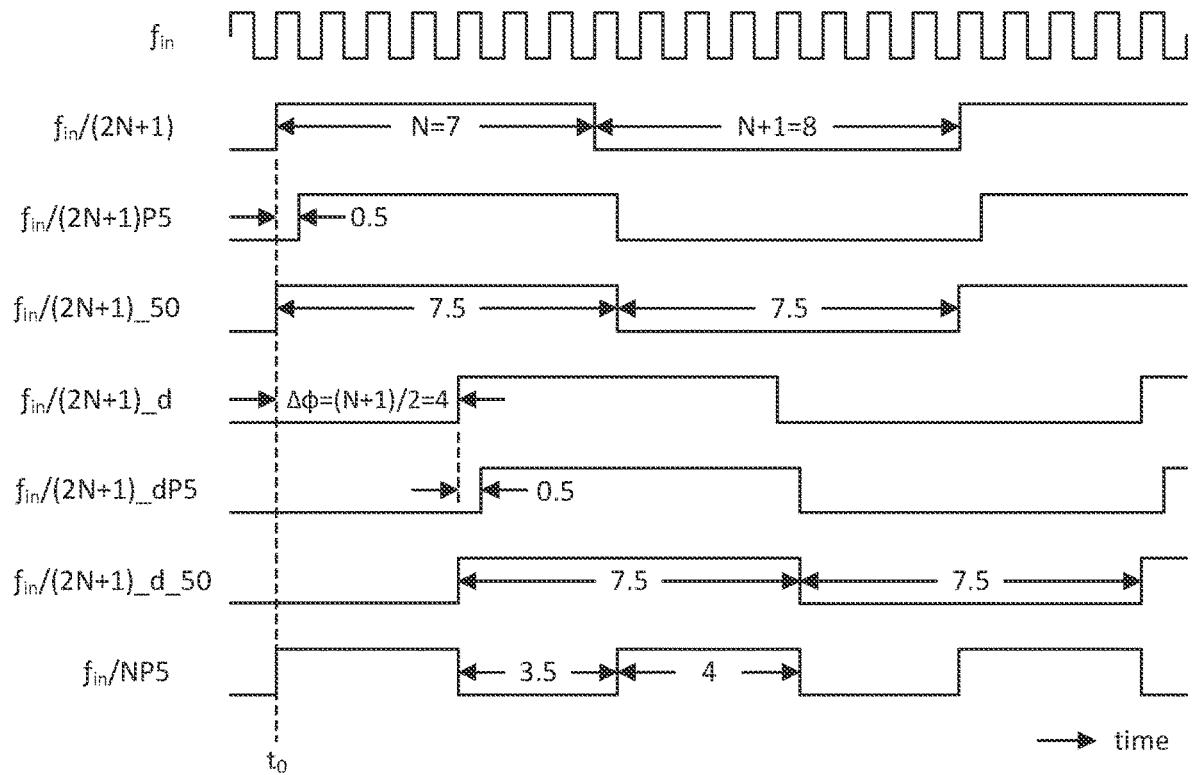
FIG. 2B illustrates a timing diagram of example signals associated with an operation of the NP5 fractional clock divider of FIG. 2A in accordance with another aspect of the disclosure.

FIG. 2B illustrates a timing diagram of example signals associated with an operation of the NP5 fractional clock divider 200 in accordance with another aspect of the disclosure. In this example, the integer N is seven (7) so that the NP5 fractional clock divider 200 has a divider ratio of 7.5. The horizontal axis of the timing diagram represents time with a unit measurement of one (1) period or cycle of the input clock signal $f_{in}$ beginning with time to.

The vertical axis, from top to bottom, represents the logic states of the input clock signal $f_{in}$, the intermediate clock signal $f_{in}/(2N+1)$, a half-cycle shifted intermediate clock signal $f_{in}/(2N+1)$ P5 used to generate the 50% duty cycle intermediate clock signal $f_{in}/(2N+1)\_50$, the 50% duty cycle intermediate clock signal $f_{in}/(2N+1)\_50$, the shifted intermediate clock signal $f_{in}/(2N+1)\_d$, a shifted (half-cycle shifted) intermediate clock signal $f_{in}/(2N+1)\_dP5$ used to generate the shifted 50% duty cycle intermediate clock signal $f_{in}/(2N+1)\_d\_50$, the shifted 50% duty cycle intermediate clock signal $f_{in}/(2N+1)\_d\_50$, and the NP5 divided clock signal $f_{in}/NP5$.

As discussed above, the intermediate clock signal $f_{in}/(2N+1)$ has a frequency being substantially the frequency of the input clock signal $f_{in}$ divided by $2N+1$ (e.g., 15 for N=7), and has a duty cycle of $N/(2N+1)$ (e.g., 7/15). Accordingly, the intermediate clock signal $f_{in}/(2N+1)$ has a rising edge substantially coinciding a clocking (e.g., rising) edge of the input clock signal $f_{in}$ at time to, has a high logic phase of seven (7) cycles of the input clock signal $f_{in}$, and a low logic phase of eight (8) cycles of the input clock signal $f_{in}$.

The duty cycle control circuit 220 may generate the half-cycle shifted intermediate clock signal $f_{in}/(2N+1)$ P5 by shifting the intermediate clock signal $f_{in}/(2N+1)$ by substantially half (0.5) a cycle of the input clock signal $f_{in}$. The duty cycle control circuit 220 may then generate the 50% duty cycle intermediate clock signal $f_{in}/(2N+1)\_50$ by performing a logic OR operation on the intermediate clock signals $f_{in}/(2N+1)$ and $f_{in}/(2N+1)$ P5. Thus, the 50% duty cycle intermediate clock signal $f_{in}/(2N+1)\_50$ has a period of substantially $2N+1$ (e.g., 15) and substantially 50% duty cycle (e.g., the high and low phases are each 7.5 cycles of the input clock signal $f_{in}$).

As discussed, the shifted intermediate clock signal $f_{in}/(2N+1)\_d$ is shifted in phase with respect to the intermediate clock signal $f_{in}/(2N+1)$ by substantially $\Delta\phi=(N+1)/2f_{in}$ if N is odd. Accordingly, for N=7, the phase difference $\Delta\phi$ between the intermediate signals $f_{in}/(2N+1)$ and $f_{in}/(2N+1)\_d$ is $(7+1)/2=4$. The duty cycle control circuit 220 may generate the shifted (half-cycle shifted) intermediate clock signal $f_{in}/(2N+1)\_dP5$ by shifting the shifted intermediate clock signal $f_{in}/(2N+1)\_d$ by substantially half (0.5) a cycle of the input clock signal $f_{in}$. The duty cycle control circuit 220 may then generate the shifted 50% duty cycle intermediate clock signal $f_{in}/(2N+1)\_d\_50$ by performing a logic OR operation on the intermediate clock signals $f_{in}/(2N+1)\_d$ and $f_{in}/(2N+1)\_dP5$. Thus, the shifted 50% duty cycle intermediate clock signal $f_{in}/(2N+1)\_d\_50$ has a period of substantially $2N+1$ (e.g., 15) and substantially 50% duty cycle (e.g., the high and low phases are each 7.5 periods of the input clock signal $f_{in}$).

The logic circuit 230 performs an exclusive-OR (XOR) operation on the 50% duty cycle intermediate clock signal $f_{in}/(2N+1)\_50$ and the shifted 50% duty cycle intermediate clock signal $f_{in}/(2N+1)\_d\_50$ to generate the NP5 divided clock signal $f_{in}/NP5$ with a frequency of substantially $f_{in}/7.5$. In this example, NP5 divided clock signal $f_{in}/NP5$ has low and high phases of 3.5 and 4 cycles of the input clock signal $f_{in}$, respectively.

Figure 3:
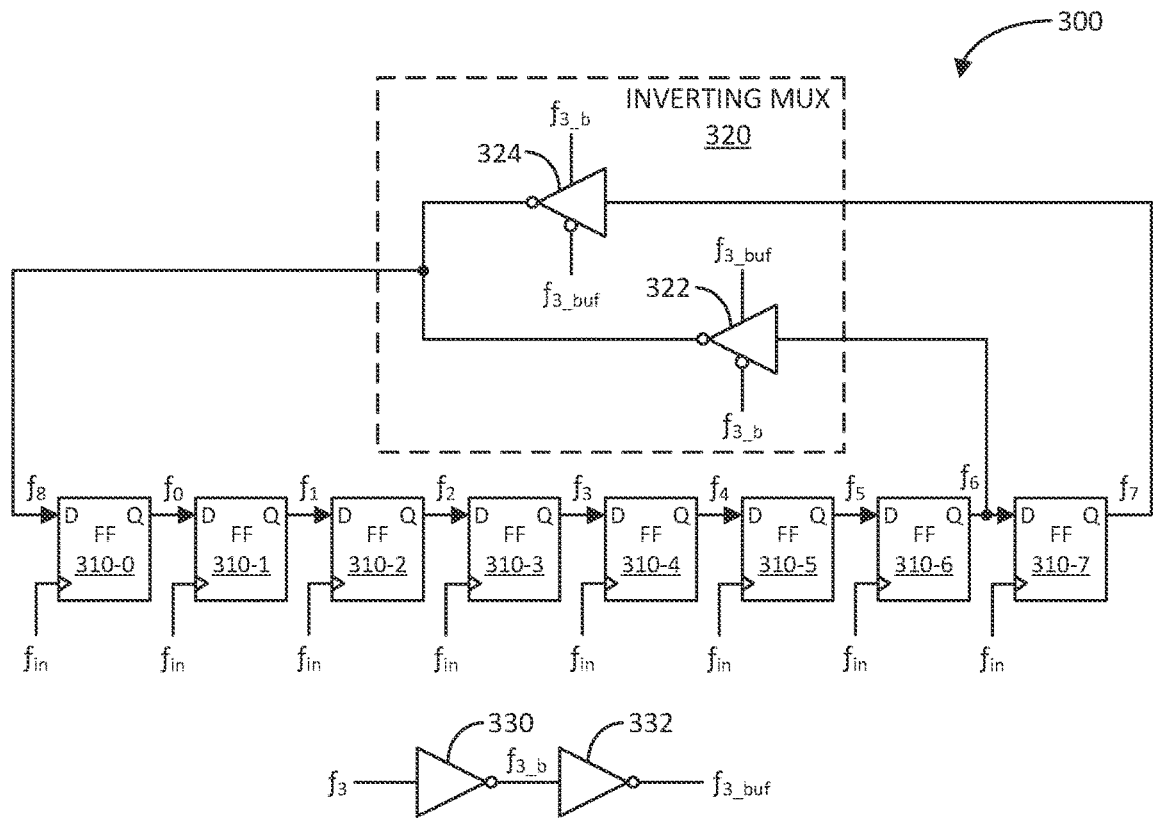
FIG. 3 illustrates a schematic diagram of an example tri-state ring oscillator (RO) in accordance with another aspect of the disclosure.

FIG. 3 illustrates a schematic diagram of an example tri-state ring oscillator (RO) 300 in accordance with another aspect of the disclosure. The tri-state RO 300 may be an example implementation of the tri-state RO 210 of NP5 fractional clock divider 200. Again, the integer N=7 serves as an example, but it could be any other integer. The tri-state RO 300 includes a set of N+1 (e.g., eight (8)) stages of cascaded flip-flops (FF) 310-0 to 310-7. More specifically, the cascaded FFs 310-0 to 310-6 include data outputs (Q) coupled to data inputs (D) of the cascaded FFs 310-1 to 310-7, respectively. Additionally, the cascaded FFs 310-0 to 310-7 include clock inputs configured to receive an input clock signal $f_{in}$. The set of cascaded FFs 310-0 to 310-7 are configured to generate a set of clock signals $f_0$ to $f_7$ at their respective data outputs (Q).

The tri-state RO 300 further includes an inverting multiplexer 320 including a first input coupled to the data output (Q) of the (N−1)th cascaded FF 310-6, a second input coupled to the data output (Q) of the $N^{th}$ cascaded FF 310-7, and an output coupled to the input (D) of the zeroth (or 0th) FF 310-0. The tri-state RO 300 further includes a pair of cascaded inverters 330 and 332. The input of the first cascaded inverter 330 is coupled to the data output (Q) of the (N−1)/2 for N being odd (or the N/2 for N being even) cascaded FF 310-3 to receive the clock signal $f_3$ therefrom. The first cascaded inverter 330 is configured to invert the clock signal $f_3$ to output the inverted clock signal $f_{3\_b}$. The second cascaded inverter 332 includes an input coupled to the output of the first cascaded inverter 330. The second cascaded inverter 332 is configured to invert the inverted clock signal $f_{3\_b}$ to output a buffered clock signal $f_{3\_buf}$.

With reference again to the inverting multiplexer 320, it includes a first tri-state inverter 322 including an input coupled to the data output (Q) of the $(N-1)^{th}$ cascaded FF 310-6, an output coupled to the data input (D) of the $0^{th}$ FF 310-0, a non-complementary enable input coupled to the output of the second cascaded inverter 332 to receive the buffered clock signal $f_{3\_buf}$, and a complementary enable input coupled to the output of the first cascaded inverter 330 to receive the inverted clock signal $f_{3\_b}$. The inverting multiplexer 320 further includes a second tri-state inverter 324 including an input coupled to the data output (Q) of the $N^{th}$ cascaded FF 310-7, an output coupled to the data input (D) of the $0^{th}$ FF 310-0 (also coupled to the output of the first tri-state inverter 322), a non-complementary enable input coupled to the output of the first cascaded inverter 330 to receive the inverted clock signal $f_{3\_b}$, and a complementary enable input coupled to the output of the second cascaded inverter 332 to receive the buffered clock signal $f_{3\_buf}$.

In operation, when the clock signal $f_3$ generated by the FF 310-3 becomes high (or exhibits a rising edge), the first tri-state inverter 322 is enabled via the high buffered clock signal $f_{3\_buf}$ applied to the non-complementary enable input of the first tri-state inverter 322, and the low inverted clock signal $f_{3\_b}$ applied to the complementary enable input of the first tri-state inverter 322. Concurrently, the second tri-state inverter 324 is disabled via the low inverted clock signal $f_{3\_b}$ applied to the non-complementary enable input of the second tri-state inverter 324, and the high buffered clock signal $f_{3\_buf}$ applied to the complementary enable input of the second tri-state inverter 324. In this configuration, the tri-state RO 300 has seven (7) stages 310-0 to 310-6; and thus, the high phase of the clock signal $f_3$ is seven (7) (or generally N) cycles of the input clock signal $f_{in}$.

When the clock signal $f_3$ generated by the FF 310-3 becomes low (or exhibits a falling edge), the second tri-state inverter 324 is enabled via the high inverted clock signal $f_{3\_b}$ applied to the non-complementary enable input of the second tri-state inverter 324, and the low buffered clock signal $f_{3\_buf}$ applied to the complementary enable input of the second tri-state inverter 324. Concurrently, the first tri-state inverter 322 is disabled via the low buffered clock signal $f_{3\_buf}$ applied to the non-complementary enable input of the first tri-state inverter 322, and the high inverted clock signal $f_{3\_b}$ applied to the complementary enable input of the first tri-state inverter 322. In this configuration, the tri-state RO 300 has eight (8) stages 310-0 to 310-7; and thus, the low phase of the clock signal $f_3$ is eight (8) (or generally N+1) cycles of the input clock signal $f_{in}$.

The buffered clock signal $f_{3\_buf}$ may be selected or outputted for the purpose of generating the intermediate clock signal $f_{in}/(2N+1)$ of the first set, as previously discussed. To achieve the phase difference $\Delta\phi=(N+1)/2$ between the intermediate clock signal $f_{in}/(2N+1)$ and the shifted intermediate clock signal $f_{in}/(2N+1)\_d$ of the first set, the clock signal $f_7$ generated by the $N^{th}$ FF 310-7 (e.g., $\Delta\phi+3=(7+1)/2+3=4+3=7$) may be selected or outputted for the purpose of generating the shifted intermediate clock signal $f_{in}/(2N+1)\_d$ of the first set, as previously discussed.

Figure 4A:
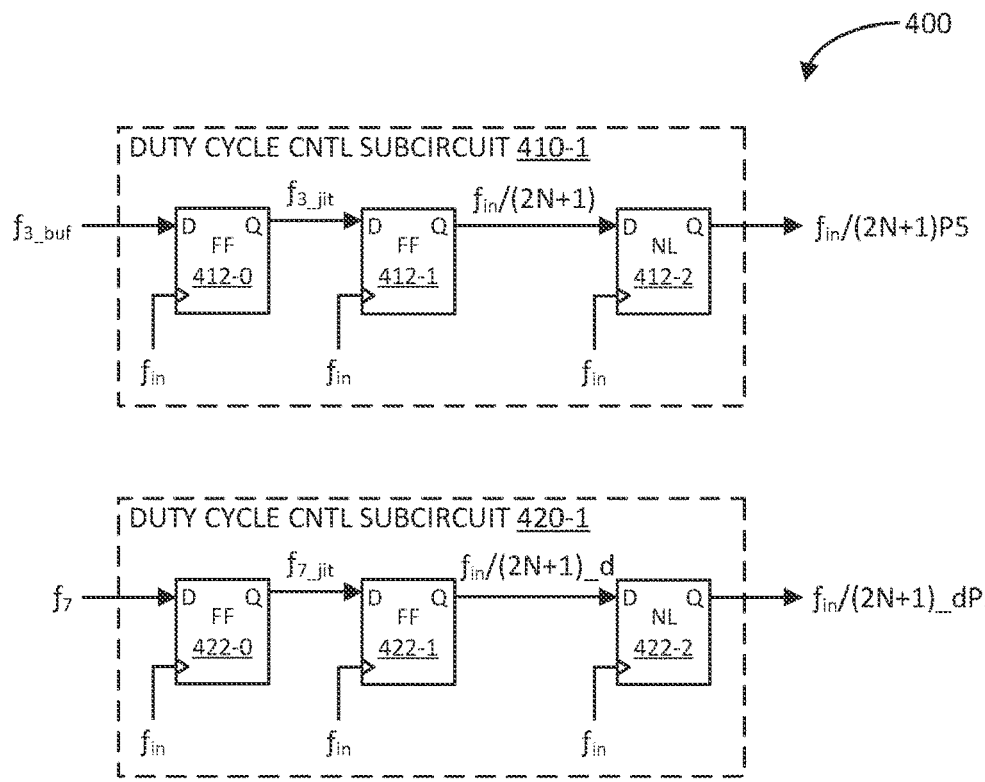
FIG. 4A illustrates a schematic diagram of an example first stage of a duty cycle control circuit with optional jitter control in accordance with another aspect of the disclosure.

FIG. 4A illustrates a schematic diagram of an example first stage of a duty cycle control circuit 400 with optional jitter control in accordance with another aspect of the disclosure. The duty cycle control circuit 400 may be an example implementation of the duty cycle control circuit 220 of NP5 fractional clock divider 200 previously discussed. The duty cycle control circuit 400 includes a first subcircuit 410-1 configured to generate the intermediate clock signal $f_{in}/(2N+1)$ and the corresponding half-cycle shifted intermediate clock signal $f_{in}/(2N+1)$ P5. Similarly, the duty cycle control circuit 400 includes a second subcircuit 420-1 configured to generate the shifted intermediate clock signal $f_{in}/(2N+1)\_d$ and the corresponding shifted (half-cycle shifted) intermediate clock signal $f_{in}/(2N+1)\_dP5$.

More specifically, the first duty cycle control subcircuit 410-1 includes a pair of cascaded flip-flops (FFs) 412-0 and 412-1, and a cascaded negative latch (NL) 412-2. That is, the first FF 412-0 includes a data input (D) configured to receive the intermediate clock signal $f_{3\_buf}$, the first and second FFs 412-0 and 412-1 include respective data outputs (Q) coupled to respective data inputs (D) of the second FF 412-1 and the NL 412-2, and the NL 412-2 includes a data output (Q) configured to output the half-cycle shifted intermediate clock signal $f_{in}/(2N+1)$ P5 based on the intermediate clock signal $f_{in}/(2N+1)$ generated by the second FF 412-1. The FFs 412-0 and 412-1 and NL 412-2 each have a clock input configured to receive the input clock signal $f_{in}$. The operational jitter control circuit includes the first and second FFs 412-0 and 412-1 and are configured to generate respective clock signals $f_{3\_jit}$ and $f_{in}/(2N+1)$ that may have reduced jitter compared to the intermediate clock signal $f_{3\_buf}$. If the jitter characteristic of the intermediate clock signal $f_{3\_buf}$ is acceptable, the intermediate clock signal $f_{3\_buf}$ may be applied directly to the data input (D) of the FF 412-1 or the NL 412-2.

The first duty cycle control subcircuit 420-1 includes a pair of cascaded flip-flops (FFs) 422-0 and 422-1, and a cascaded negative latch (NL) 422-2. That is, the first FF 422-0 includes a data input (D) configured to receive the intermediate clock signal $f_7$, the first and second FFs 422-0 and 422-1 include respective data outputs (Q) coupled to respective data inputs (D) of the second FFs 422-1 and the NL 422-2, and the NL 422-2 includes a data output (Q) configured to output the shifted (half-cycle shifted) intermediate clock signal $f_{in}/(2N+1)\_dP5$ based on the shifted intermediate clock signal $f_{in}/(2N+1)\_d$ generated by the second FF 422-1. The cascaded FFs 422-0 and 422-1 and NL 422-2 each have a clock input configured to receive the input clock signal $f_{in}$. The optional jitter control circuit includes the first and second FFs 422-0 and 422-1 and are configured to generate respective clock signal $f_{7\_jit}$ and $f_{in}/(2N+1)\_d$ that may have reduced jitter compared to the intermediate clock signal $f_7$. If the jitter characteristic of the intermediate clock signal $f_7$ is acceptable, the intermediate clock signal $f_7$ may be applied directly to the data input (D) of the FF 422-1 or the NL 422-2.

Figure 4B:
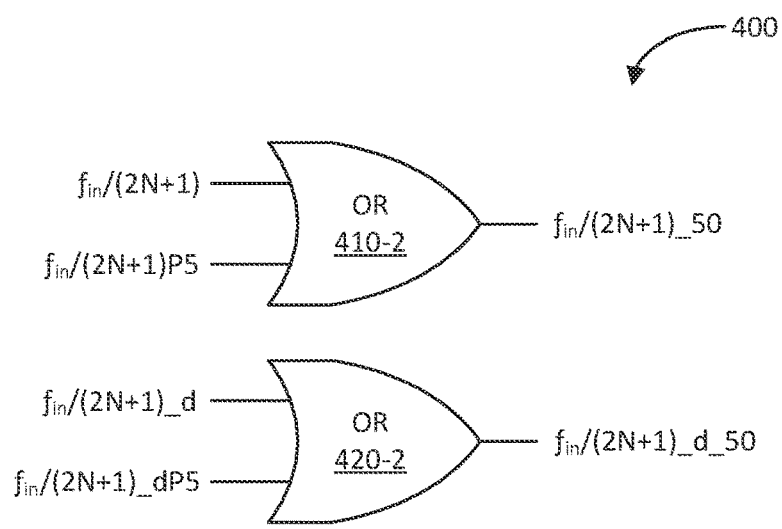
FIG. 4B illustrates a schematic diagram of an example second stage of the duty cycle control circuit in accordance with another aspect of the disclosure.

FIG. 4B illustrates a schematic diagram of an example second stage of the duty cycle control circuit 400 in accordance with another aspect of the disclosure. The duty cycle control circuit 400 includes a first logic circuit or gate 410-2 including inputs coupled to the data outputs (Q) of the FF 412-1 and NL 412-2 to receive the intermediate clock signal $f_{in}/(2N+1)$ and the half-cycle shifted clock signal $f_{in}/(2N+1)$ P5, respectively. The first logic gate 410-2 is configured to perform an OR operation on the clock signals $f_{in}/(2N+1)$ and $f_{in}/(2N+1)$ P5 to generate the 50% duty cycle intermediate clock signal $f_{in}/(2N+1)\_50$.

The duty cycle control circuit 400 further includes a second logic circuit or gate 420-2 including inputs coupled to the data outputs (Q) of the FF 422-1 and NL 422-2 to receive the shifted intermediate clock signal $f_{in}/(2N+1)\_d$ and the shifted (half-cycle shifted) clock signal $f_{in}/(2N+1)\_dP5$, respectively. The second logic gate 420-2 is configured to perform an OR operation on the clock signals $f_{in}/(2N+1)\_d$ and $f_{in}/(2N+1)\_dP5$ to generate the shifted 50% duty cycle intermediate clock signal $f_{in}/(2N+1)\_d\_50$. As previously discussed with reference to the NP5 fractional clock divider 200, the logic circuit 230 is configured to perform an XOR operation on the 50% duty cycle clock signals $f_{in}/(2N+1)\_50$ and $f_{in}/(2N+1)\_d\_50$ to generate the NP5 fractional clock signal $f_{in}/NP5$.

Figure 5:
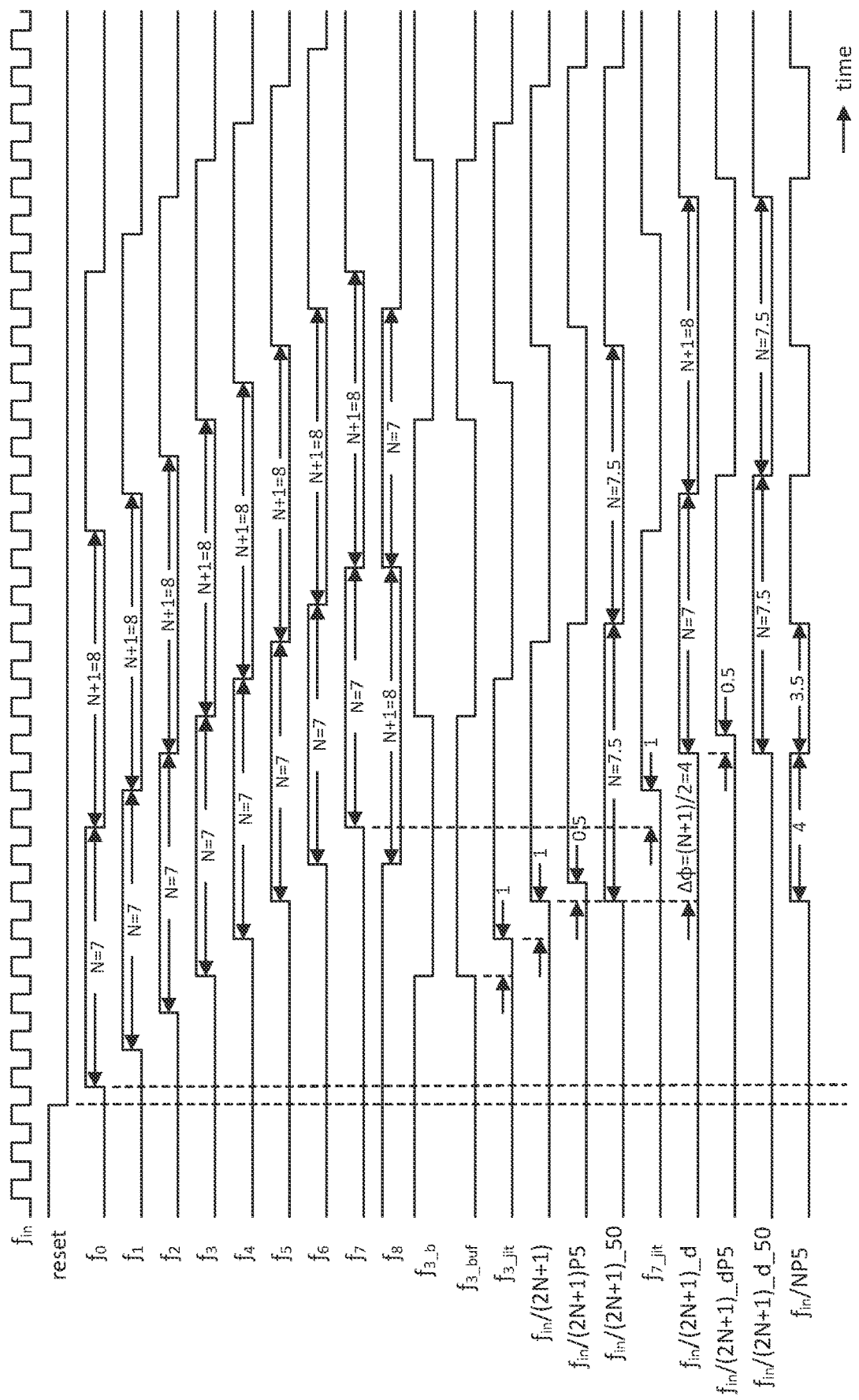
FIG. 5 illustrates a timing diagram of example signals associated with an operation of the NP5 fractional clock divider of FIGS. 2A, 3, and 4A-4B in accordance with another aspect of the disclosure.

FIG. 5 illustrates a timing diagram of example signals associated with an operation of the NP5 fractional clock divider 200 including the tri-state RO 300, the duty cycle control circuit 400 with optional jitter control, and the logic circuit 230 in accordance with another aspect of the disclosure. In this example, the integer N is seven (7) so that the NP5 fractional clock divider 200 has a divider ratio of 7.5. The horizontal axis of the timing diagram represents time with a unit measurement of one (1) period or cycle of the input clock signal $f_{in}$. The deasserting reset signal initiates the operation of the tri-state RO 300, for example, by enabling the tri-state inverters 322 and 324 to be responsive to the clock signals $f_{3\_b}$ and $f_{3\_buf}$, or in other manners.

The vertical axis, from top to bottom, represents the logic states of the input clock signal $f_{in}$, the reset signal, the set of clock signals $f_0$-$f_8$, $f_{3\_b}$, and $f_{3\_buf}$ of the tri-state RO 300, the jitter-controlled clock signal $f_{3\_jit}$, the intermediate clock signal $f_{in}/(2N+1)$, the half-cycle shifted intermediate clock signal $f_{in}/(2N+1)$ P5, the 50% duty cycle intermediate clock signal $f_{in}/(2N+1)\_50$, the shifted jitter-controlled clock signal $f_{7\_jit}$, the shifted intermediate clock signal $f_{in}/(2N+1)\_d$, the shifted (half-cycle shifted) intermediate clock signal $f_{in}/(2N+1)\_dP5$, the shifted 50% duty cycle intermediate clock signal $f_{in}/(2N+1)\_d\_50$, and the NP5 divided clock signal $f_{in}/NP5$.

In response to the deassertion of the reset signal at time $t_0$, the tri-state RO 300 begins to generate the clock signals $f_0$-$f_8$, where the clock signals $f_0$-$f_7$ are shifted by one cycle of the input clock signal $f_{in}$ with respect to clock signals $f_7$, $f_0$-$f_6$, respectively. The clock signal $f_8$ has a low phase initiated by the rising edge of the clock signal $f_6$, and a high phase initiated by the falling edge of clock signal $f_7$. Each of the clock signals $f_0$-$f_8$ has a high phase of N=7 and a low phase of N+1=8. The clock signal $f_{3\_b}$ is the inverted clock signal $f_3$. The clock signal $f_{3\_buf}$ is the buffered clock signal $f_3$.

With regard to the duty cycle control circuit 400 with optional jitter control, the clock signal $f_{3\_jit}$ has a one (1) cycle delay with respect to the buffered clock signal $f_{3\_buf}$. The intermediate clock signal $f_{in}/(2N+1)$ has a one (1) cycle delay with respect to the jitter-controlled clock signal $f_{3\_jit}$. The half-cycle shifted clock signal $f_{in}/(2N+1)$ P5 has a half (0.5) cycle delay with respect to the intermediate clock signal $f_{in}/(2N+1)$. The 50% duty cycle intermediate clock signal $f_{in}/(2N+1)\_50$ is generated by performing a logic OR operation on the intermediate clock signals $f_{in}/(2N+1)$ and $f_{in}/(2N+1)$ P5. Thus, the 50% duty cycle intermediate clock signal $f_{in}/(2N+1)\_50$ has a period of 2N+1 (e.g., 15) and 50% duty cycle (e.g., the high and low phases are each 7.5 periods of the input clock signal $f_{in}$).

With regard to the duty cycle control circuit 400 with optional jitter control, the clock signal $f_{7\_jit}$ has a one (1) cycle delay with respect to the clock signal $f_7$. The shifted intermediate clock signal $f_{in}/(2N+1)\_d$ has a one (1) cycle delay with respect to the jitter-controlled clock signal $f_{7\_jit}$. The shifted (half-cycle shifted) clock signal $f_{in}/(2N+1)\_dP5$ has a half (0.5) cycle delay with respect to the shifted intermediate clock signal $f_{in}/(2N+1)\_d$. The shifted 50% duty cycle intermediate clock signal $f_{in}/(2N+1)\_d\_50$ is generated by performing a logic OR operation on the shifted intermediate clock signals $f_{in}/(2N+1)\_d$ and $f_{in}/(2N+1)\_dP5$. Thus, the shifted 50% duty cycle intermediate clock signal $f_{in}/(2N+1)\_d\_50$ has a period of 2N+1 (e.g., 15) and 50% duty cycle (e.g., the high and low phases are each 7.5 periods of the input clock signal $f_{in}$).

The logic circuit 230 performs an exclusive-OR (XOR) operation on the 50% duty cycle intermediate clock signal $f_{in}/(2N+1)\_50$ and the shifted 50% duty cycle intermediate clock signal $f_{in}/(2N+1)\_d\_50$ to generate the NP5 divided clock signal $f_{in}/NP5$ with a frequency of substantially $f_{in}/7.5$. In this example, NP5 divided clock signal $f_{in}/NP5$ has high and low phases of 4 and 3.5 periods of the input clock signal $f_{in}$, respectively.

Figure 6:
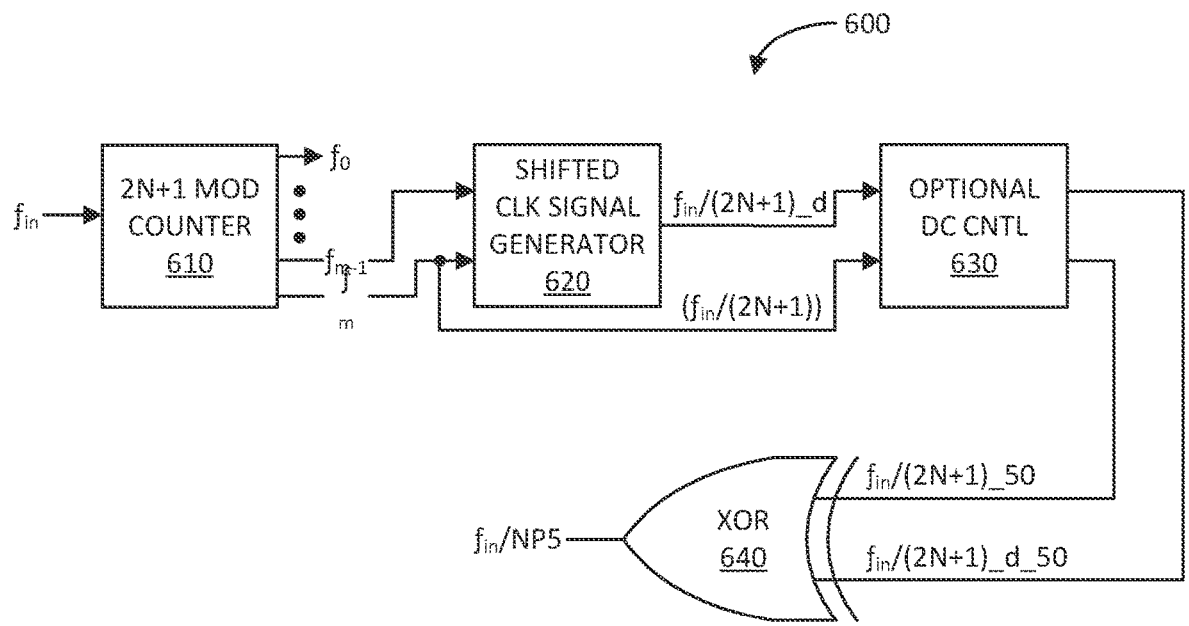
FIG. 6 illustrates a block diagram of another example NP5 fractional clock divider in accordance with another aspect of the disclosure.

FIG. 6 illustrates a block diagram of another example NP5 fractional clock divider 600 in accordance with another aspect of the disclosure. The NP5 fractional clock divider 600 includes a 2N+1 (e.g., 15 for N=7) modulo counter 610 to generate an intermediate clock signal $f_{in}/(2N+1)$ with a frequency substantially equal to a frequency of an input clock signal $f_{in}$ divided by 2N+1, where N is the integer and P5 is the half (0.5) fraction in the NP5 divider ratio, as previously discussed. Similarly, the intermediate clock signal $f_{in}/(2N+1)$ has a duty cycle of N/(2N+1) with a first (e.g., high) phase being N periods or cycles of the input clock signal $f_{in}$ and a second (e.g., low) phase being N+1 periods or cycles of the input clock signal $f_{in}$. As previously discussed, in an alternative implementation, the intermediate clock signals $f_{in}/(2N+1)$ may have a duty cycle of N+1/(2N+1), with a first phase (e.g., a logic high phase) spanning N+1 cycles of the input clock signal $f_{in}$ and a second phase (e.g., a logic low phase) spanning N cycles of the input clock signal $f_{in}$.

The NP5 fractional clock divider 600 includes a shifted clock signal generator 620 configured to generate a shifted intermediate clock signal $f_{in}/(2N+1)\_d$ with a frequency substantially the same as the intermediate clock signal $f_{in}/(2N+1)$, but shifted in phase with respect to the intermediate clock signal $f_{in}/(2N+1)$ by substantially $\Delta\phi=(N+1)/2f_{in}$ if N is odd and $\Delta\phi=(N)/2f_{in}$ if N is even. Further, the NP5 fractional clock divider 600 may include an optional duty cycle control circuit 630 configured to generate substantially 50% duty cycle versions $f_{in}/(2N+1)\_50$ and $f_{in}/(2N+1)\_d\_50$ of the intermediate clock signal $f_{in}/(2N+1)$ and shifted intermediate clock signal $f_{in}/(2N+1)\_d$, respectively.

In this implementation, the duty cycle control circuit 630 is optional as the 2N+1 modulo counter 610 may generate the substantially 50% duty cycle intermediate clock signal $f_{in}/(2N+1)\_50$ for some values of N, and the shifted clock signal generator 620 may generate the shifted substantially 50% duty cycle intermediate clock signal $f_{in}/(2N+1)\_d\_50$ based on the 50% duty cycle intermediate clock signal $f_{in}/(2N+1)\_50$. As in the previous implementations, the NP5 fractional clock divider 600 further includes a logic circuit 640 configured to perform an exclusive-OR (XOR) operation on the 50% duty cycle intermediate clock signal $f_{in}/(2N+1)\_50$ and the shifted 50% duty cycle intermediate clock signal $f_{in}/(2N+1)\_d\_50$ to generate the NP5 divided clock signal $f_{in}/NP5$.

More specifically, the 2N+1 modulo counter 610 is configured to receive the input clock signal $f_{in}$, and generate a set of clock signals $f_0$ to $f_m$, where m may be set in accordance with the following relationship: $2^{(m+1)} > (2N+1)$. In the example used herein of N=7, m may be set to three (3) (e.g., $2^{(3+1)} > 2*7+1 \rightarrow 2^4$ or 16>15). The clock signal $f_m$ generated by the 2N+1 modulo counter 610 may serve or may be used to generate the intermediate clock signal $f_{in}/(2N+1)$. Unlike the tri-state RO 210/300 of NP5 fractional clock generator 200, the 2N+1 modulo counter 610 may not be able to generate the shifted intermediate clock signal $f_{in}/(2N+1)\_d$. Accordingly, the shifted clock signal generator 620 may be provided to generate the shifted intermediate clock signal $f_{in}/(2N+1)\_d$ based on the clock signals $f_m$ and $f_{m-1}$, as discussed further herein.

Figure 7A:
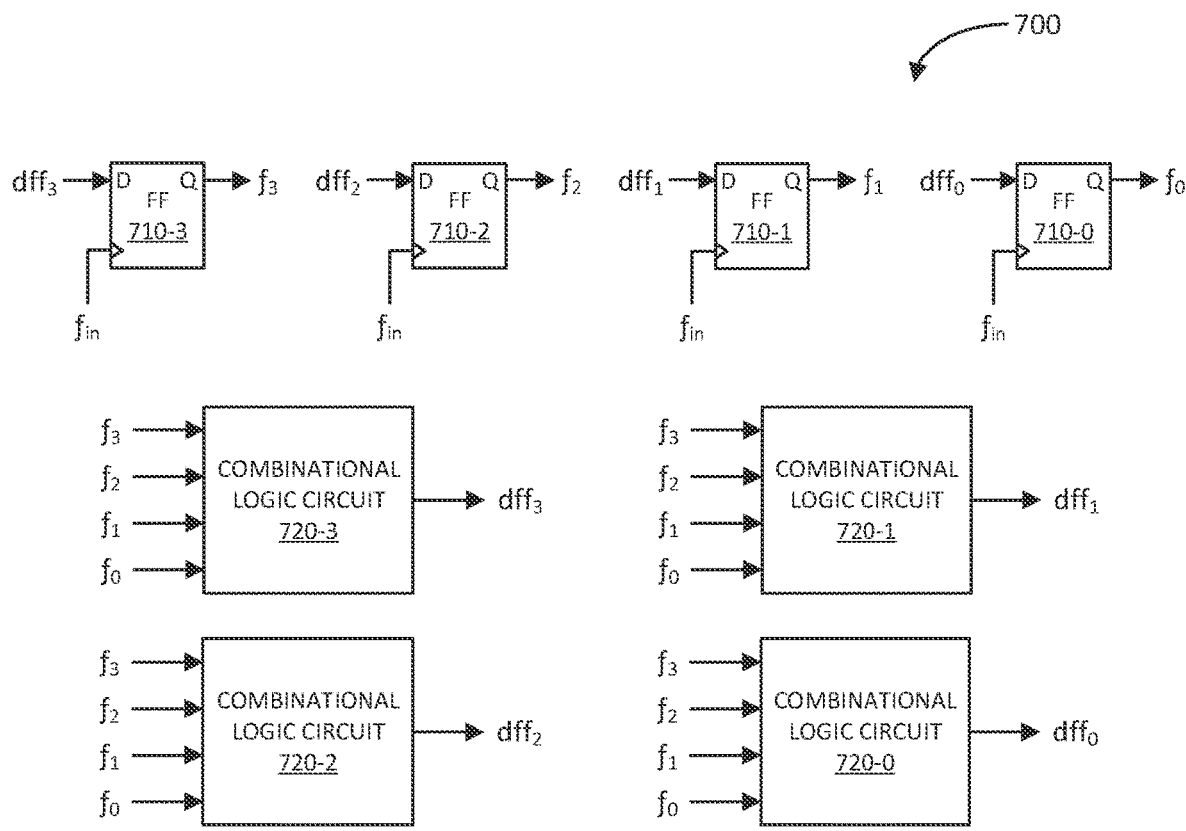
FIG. 7A illustrates a block diagram of an example 2N+1 modulo counter in accordance with another aspect of the disclosure.

FIG. 7A illustrates a block diagram of an example 2N+1 modulo counter 700 in accordance with another aspect of the disclosure. In this example, the 2N+1 modulo counter 700 is implemented for the case where N=7 and, as discussed above, m=3. It shall be understood that the 2N+1 modulo counter 700 may be implemented per different integer values of N.

In particular, the 2N+1 modulo counter 700 includes a set of m+1 flip-flops (FFs) 710-0 to 710-3, where the set of FFs 710-0 include data inputs (D) configured to receive clock signals $dff_0$ to $dff_3$, and data outputs (Q) configured to output the set of clock signals $f_0$ to $f_3$, respectively. The set of FFs 710-0 to 710-3 further includes clock inputs configured to receive the input clock signal $f_{in}$.

The 2N+1 modulo counter 700 further includes a set of m+1 combinational logic circuits 720-0 to 720-3 each configured to receive the set of clock signals $f_0$ to $f_3$, and generate the set of clock signals $dff_0$ to $dff_3$ based on a set of combinational logic operations performed on the set of clock signals $f_0$ to $f_3$, respectively.

FIG. 7B illustrates example truth table and Karnaugh maps associated with the 2N+1 (e.g., 15) modulo counter 700 in accordance with another aspect of the disclosure. With regard to the truth table, there are two main columns for the "present state" of the clock signals $f_0$ to $f_3$ and for the corresponding "next state" of the clock signals $dff_0$ to $dff_3$. Under the "present state" column, there are four (4) sub-columns for the states of the clock signals $f_0$ to $f_3$. As the 2N+1 modulo counter 700, in this example, counts from zero (0) to 14, the corresponding states of the clock signals $f_0$ to $f_3$ from 0 to 14 are provided in ascending order. Under the "next state" column, there are four (4) sub-columns for the states of the clock signals $dff_0$ to $dff_3$, which are the states of the clock signals $f_0$ to $f_3$ after being clocked by the input clock signal $f_{in}$. Accordingly, as the states of the clock signals $f_0$ to $f_3$ are shown in ascending order from 0 to 14, the corresponding "next state" clock signals $dff_0$ to $dff_3$ are shown in ascending order from 1 to 14 and back to 0.

The Karnaugh maps describe the combinational logic circuits 720-0 to 720-3. For example, the combinational logic circuit 720-0 for generating clock signal $dff_0$ has a logic function of $(f_{1b} \& f_{0b}) + (f_1 \& f_{0b} \& (f_{2b}+f_{3b} \& f_2))$, where "&" stands for the logic AND operation, and "+" stands for the logic OR operation. The corresponding Karnaugh map for clock signal $dff_0$ maps the states of the clock signals $f_0$ to $f_3$ to the clock signal $dff_0$. Similarly, the combinational logic circuit 720-1 for generating clock signal $dff_1$ has a logic function of $(f_{1b} \& f_0) + (f_1 \& f_{0b} \& (f_{2b} + f_{3b} \& f_2))$. The corresponding Karnaugh map for clock signal $dff_1$ maps the states of the clock signals $f_0$ to $f_3$ to the clock signal $dff_1$.

Similarly, the combinational logic circuit 720-2 for generating clock signal $dff_2$ has a logic function of $(f_2\&f_{1b})+(f_1f_0f_{2b})+(f_1f_{0b}f_{3b}f_2)$, where no symbol between multiple clock signals is a shorthand for an AND operation. The corresponding Karnaugh map for clock signal $dff_2$ maps the states of the clock signals $f_0$ to $f_3$ to the clock signal $dff_2$. Similarly, the combinational logic circuit 720-3 for generating clock signal $dff_3$ has a logic function of $(f_3\&f_{1b})+(f_1\&f_3\&f_{2b})+(f_1\&f_0\&f_{3b}\& f_2)$. The corresponding Karnaugh map for clock signal $dff_3$ maps the states of the clock signals $f_0$ to $f_3$ to the clock signal $dff_3$.

Figure 8A:
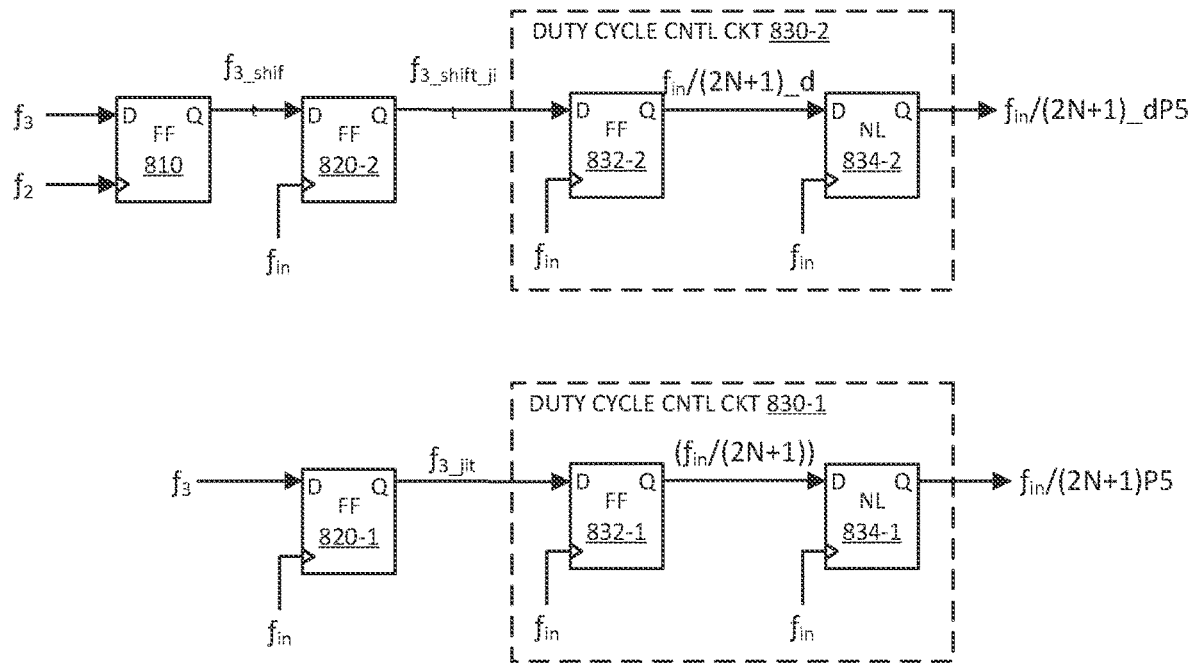
FIG. 8A illustrates a schematic diagram of an example clock signal shift generator and first stage duty cycle control circuit with optional jitter control associated with the NP5 fractional clock divider of FIG. 6 in accordance with another aspect of the disclosure.

FIG. 8A illustrates a schematic diagram of an example shifted clock signal generator 810, jitter control circuits 820-1 and 820-2, and first stage duty cycle control circuits 830-1 and 830-2 in accordance with another aspect of the disclosure. The shifted clock signal generator 810 may be an example implementation of the shifted clock signal generator 620. The jitter control circuits 820-1 and 820-2 may be configured to control the jitter characteristic of the clock signals provided to the first stage duty cycle control circuits 830-1 and 830-2. And, the first stage duty cycle control circuits 830-1 and 830-2 are configured to generate the clock signals to generate the 50% duty cycle intermediate clock signal and shifted 50% duty cycle intermediate clock signal.

In particular, the shifted clock signal generator 810 is implemented as a flip-flop (FF) including a data input (D) configured to receive the clock signal $f_3$ (e.g., $f_m$) from the 2N+1 modulo counter 610 or 700, a clock input configured to receive the clock signal $f_2$ (e.g., $f_{m-1}$) from the 2N+1 modulo counter 610 or 700, and a data output (Q) configured to output a shifted clock signal $f_3$_shift. The jitter control circuit 820-1 may be implemented as FF including a data input (D) configured to receive the clock signal $f_3$ from the 2N+1 modulo counter 610 or 700, a clock input configured to receive the input clock signal $f_{in}$, and a data output (Q) configured to output a jitter-controlled clock signal $f_{3\_jit}$ that may have lower jitter characteristics than the clock signal $f_3$. Similarly, the jitter control circuit 820-2 may be implemented as FF including a data input (D) configured to receive the shifted clock signal $f_{3\_shift}$ from the shifted clock signal generator 810, a clock input configured to receive the input clock signal $f_{in}$, and a data output (Q) configured to output a shifted jitter-controlled clock signal $f_{3\_shift\_jit}$ that may have lower jitter characteristics than the shifted clock signal $f_{3\_shift}$.

The first stage duty cycle control circuit 830-1 includes cascaded FF 832-1 and NL 834-1. The FF 832-1 includes a data input (D) coupled to the data output (Q) of the jitter-control FF 820-1, a clock input configured to receive the input clock signal $f_{in}$, and a data output (Q) configured to output an intermediate clock signal $f_{in}/(2N+1)$. The NL 834-1 includes a data input (D) coupled to the data output (Q) of the FF 832-1, a clock input configured to receive the input clock signal $f_{in}$, and a data output (Q) configured to output a half-cycle shifted intermediate clock signal $f_{in}/(2N+1)$ P5.

The shifted first stage duty cycle control circuit 830-2 includes cascaded FF 832-2 and NL 834-2. The FF 832-2 includes a data input (D) coupled to the data output (Q) of the jitter-control FF 820-2, a clock input configured to receive the input clock signal $f_{in}$, and a data output (Q) to output a shifted intermediate clock signal $f_{in}/(2N+1)\_d$. The NL 834-2 includes a data input (D) coupled to the data output (Q) of the FF 832-2, a clock input configured to receive the input clock signal $f_{in}$, and a data output (Q) to output a shifted (half-cycle shifted) intermediate clock signal $f_{in}/(2N+1)\_dP5$.

Figure 8B:
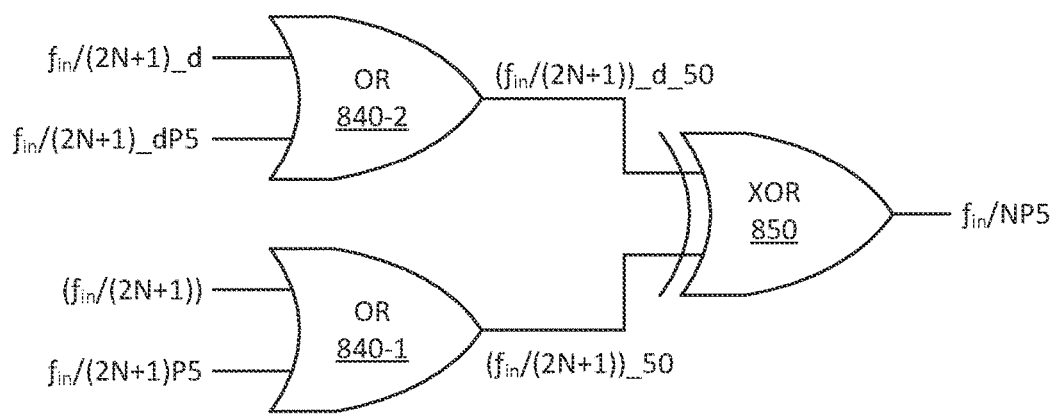
FIG. 8B illustrates a schematic diagram of an example second stage duty cycle control circuit and NP5 fractional clock generator associated with the NP5 fractional clock divider of FIG. 6 in accordance with another aspect of the disclosure.

FIG. 8B illustrates a schematic diagram of an example second stage duty cycle control circuits 840-1 and 840-2 and NP5 fractional clock generator 850 in accordance with another aspect of the disclosure. The second stage duty cycle control circuit 840-1 may be implemented as a logic circuit or gate configured to perform an OR operation on the intermediate clock signal $f_{in}/(2N+1)$ and the half-cycle shifted intermediate clock signal $f_{in}/(2N+1)$ P5 to generate a substantially 50% duty cycle intermediate clock signal $f_{in}/(2N+1)\_50$.

The second stage duty cycle control circuit 840-2 may be implemented as a logic circuit or gate configured to perform an OR operation on the shifted intermediate clock signal $f_{in}/(2N+1)\_d$ and the shifted (half-cycle shifted) intermediate clock signal $f_{in}/(2N+1)\_dP5$ to generate a shifted substantially 50% duty cycle intermediate clock signal $f_{in}/(2N+1)\_d\_50$. The NP5 fractional clock generator 850 may be implemented as a logic circuit or gate configured to perform an exclusive-OR (XOR) operation on the 50% duty cycle intermediate clock signal $f_{in}/(2N+1)\_50$ and the shifted 50% duty cycle intermediate clock signal $f_{in}/(2N+1)\_d\_50$ to generate the NP5 divided clock signal $f_{in}/NP5$.

Figure 9:
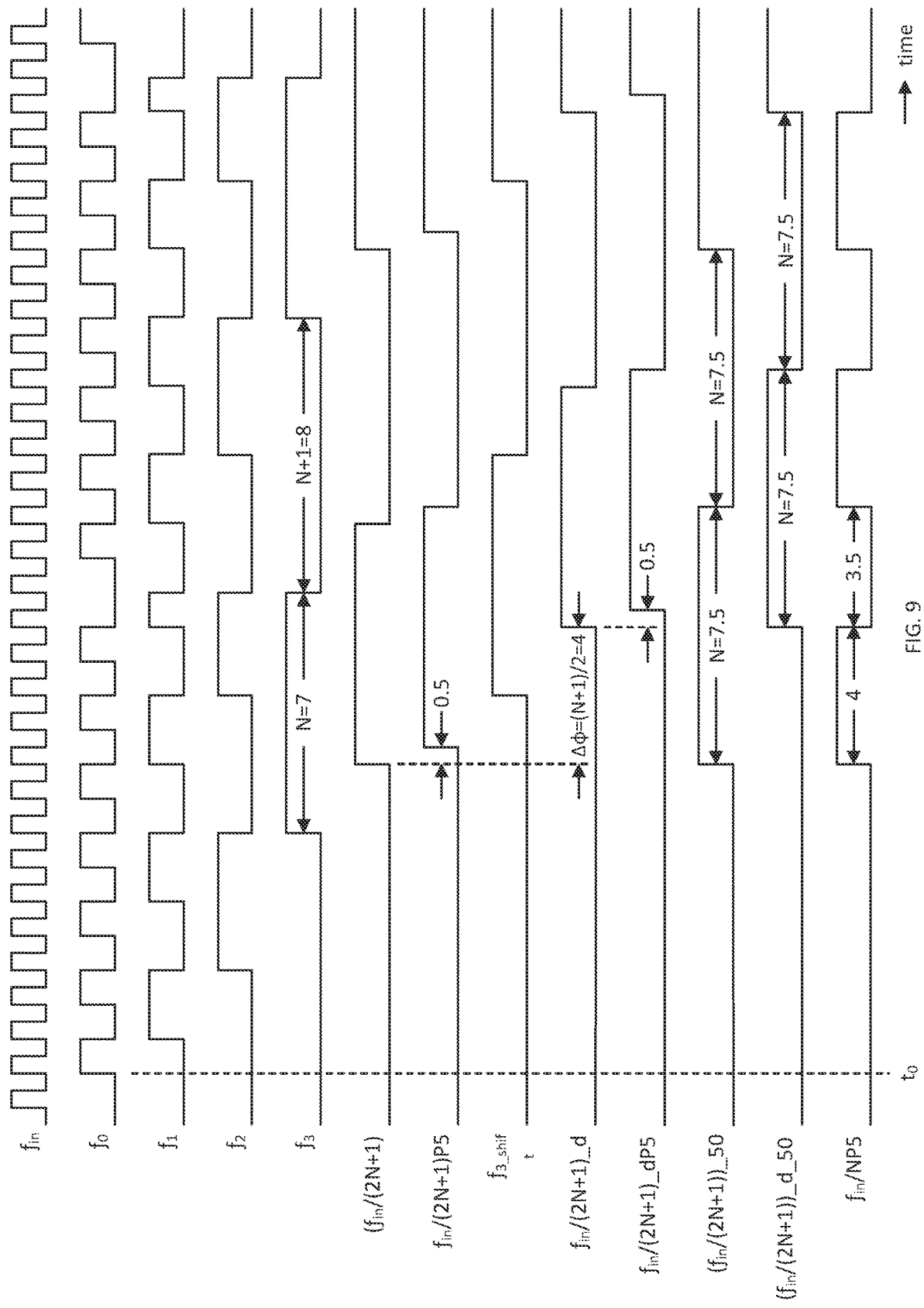
FIG. 9 illustrates a timing diagram of example signals associated with an operation of the NP5 fractional clock divider of FIGS. 6, 7A-7B, and 8A-8B in accordance with another aspect of the disclosure.

FIG. 9 illustrates a timing diagram of example signals associated with an operation of the NP5 fractional clock divider 600 including the 2N+1 modulo counter 610/700, the shifted clock signal generator 620/810, the duty cycle control circuit with jitter control 630/(820-1/820-2)/(830-1/830-2)/(840-1/840-2), and logic circuit 640/850 in accordance with another aspect of the disclosure. Similarly, in this example, the integer N is seven (7) so that the NP5 fractional clock divider 600 has a divider ratio of 7.5. The horizontal axis of the timing diagram represents time with a unit measurement of one (1) period or cycle of the input clock signal $f_{in}$.

The vertical axis, from top to bottom, represents the logic states of the input clock signal $f_{in}$, the set of clock signals $f_0$-$f_3$ generated by the 2N+1 modulo counter 610/700, the intermediate clock signal $f_{in}/(2N+1)$, the half-cycle shifted intermediate clock signal $f_{in}/(2N+1)$ P5, the shifted clock signal $f_3$_shift, the shifted intermediate clock signal $f_{in}/(2N+1)\_d$, the shifted (half-cycle shifted) intermediate clock signal $f_{in}/(2N+1)\_dP5$, the 50% duty cycle intermediate clock signal $f_{in}/(2N+1)\_50$, the shifted 50% duty cycle intermediate clock signal $f_{in}/(2N+1)\_d\_50$, and the NP5 divided clock signal $f_{in}/NP5$.

The frequencies of the clock signals $f_0$-$f_3$ are nearly the frequency of the input clock signal $f_{in}$ divided by 2m (where m=0-3), with the exception that the present state=15 (1111) is not a generated state, which results in the clock signal $f_3$ with a frequency of $f_{in}/(2N+1)$, with a first (e.g., high) phase of N=7 and a second (e.g., low) phase of N+1 periods or cycles of the input clock signal $f_{in}$ (e.g., a duty cycle of N/(2N+1)=7/15). The intermediate clock signal $f_{in}/(2N+1)$ is the clock signal $f_3$ shifted by two (2) input clock cycles effectuated by FFs 820-1 and 832-1 for jitter reduction purposes. The half-cycle shifted clock signal $f_{in}/(2N+1)$ P5 has a half (0.5) cycle delay with respect to the intermediate clock signal $f_{in}/(2N+1)$ effectuated by NL 834-1.

The shifted clock signal $f_3$_shift, generated by the shifted clock signal generator 620 or FF 810, is shifted with respect to the clock signal $f_3$ by a phase difference $\Delta\phi=(N+1)/2f_{in}$ (e.g., four (4) cycles of the input clock signal $f_{in}$). It follows then that the shifted intermediate clock signal $f_{in}/(2N+1)\_d$ is shifted with respect to the intermediate clock signal $f_{in}/(2N+1)$ by the substantially same phase difference (e.g., four (4) cycles of the input clock signal $f_{in}$) effectuated by the FFs 820-2 and 832-2. The shifted (half-cycle shifted) clock signal $f_{in}/(2N+1)\_dP5$ has a half (0.5) cycle delay with respect to the shifted intermediate clock signal $f_{in}/(2N+1)\_d$ effectuated by NL 834-2.

The 50% duty cycle intermediate clock signal $f_{in}/(2N+1)\_50$ is generated by performing a logic OR operation on the intermediate clock signals $f_{in}/(2N+1)$ and $f_{in}/(2N+1)$ P5 effectuated by the logic OR gate 840-1. Thus, the 50% duty cycle intermediate clock signal $f_{in}/(2N+1)\_50$ has a period of 2N+1 (e.g., 15) and 50% duty cycle (e.g., the high and low phases are each 7.5 cycles of the input clock signal $f_{in}$). Similarly, the shifted 50% duty cycle intermediate clock signal $f_{in}/(2N+1)\_d\_50$ is generated by performing a logic OR operation on the shifted intermediate clock signals $f_{in}/(2N+1)\_d$ and $f_{in}/(2N+1)\_dP5$ effectuated by the logic OR gate 840-2. Thus, the shifted 50% duty cycle intermediate clock signal $f_{in}/(2N+1)\_d\_50$ has a period of 2N+1 (e.g., 15) and 50% duty cycle (e.g., the high and low phases are each 7.5 cycles of the input clock signal $f_{in}$).

The logic circuit 640/850 performs an exclusive-OR (XOR) operation on the 50% duty cycle intermediate clock signal $f_{in}/(2N+1)\_50$ and the shifted 50% duty cycle intermediate clock signal $f_{in}/(2N+1)\_d\_50$ to generate the NP5 divided clock signal $f_{in}/NP5$ with a frequency of $f_{in}/7.5$. In this example, the NP5 divided clock signal $f_{in}/NP5$ has high and low phases of four (4) and 3.5 periods of the input clock signal $f_{in}$, respectively.

Figure 10:
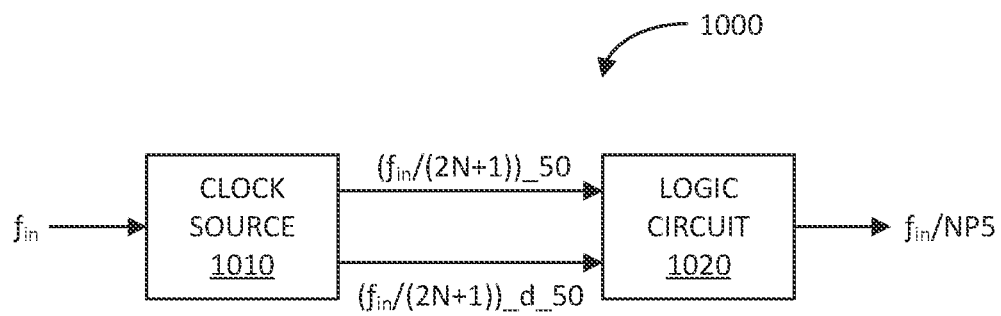
FIG. 10 illustrates a block diagram of another example NP5 fractional clock divider in accordance with another aspect of the disclosure.

FIG. 10 illustrates a block diagram of another example NP5 fractional clock divider 1000 in accordance with another aspect of the disclosure. The NP5 fractional clock divider 1000 includes a clock source 1010 configured to generate first and second clock signals $f_{in}/(2N+1)\_50$ and $f_{in}/(2N+1)\_d\_50$ based on an input clock signal, wherein each of the first and second clock signals $f_{in}/(2N+1)\_50$ and $f_{in}/(2N+1)\_d\_50$ has a frequency being substantially a frequency of the input clock signal divided by 2N+1, where N is an integer. The NP5 fractional clock divider 1000 further includes a logic circuit 1020 configured to perform a logic operation on the first and second clock signals $f_{in}/(2N+1)\_50$ and $f_{in}/(2N+1)\_d\_50$ to generate an output clock signal $f_{in}/NP5$ with a frequency being substantially the frequency of the input clock signal divided by NP5, where P5 is a half fraction.

Figure 11:
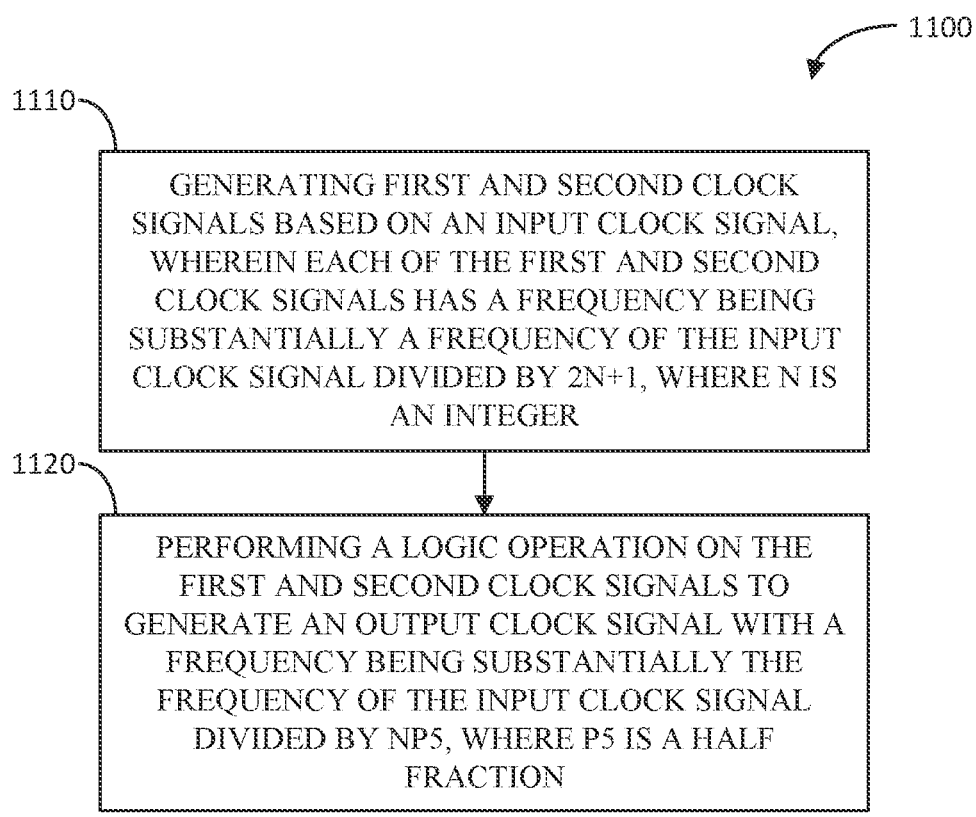
FIG. 11 illustrates a flow diagram of an example method of fractionally dividing a clock signal in accordance with another aspect of the disclosure.

FIG. 11 illustrates a flow diagram of an example method 1100 of fractionally dividing a clock signal in accordance with another aspect of the disclosure. The method 1100 includes generating first and second clock signals based on an input clock signal, wherein each of the first and second clock signals has a frequency being substantially a frequency of the input clock signal divided by 2N+1, where N is an integer (block 1110). Examples of means for generating first and second clock signals based on an input clock signal, wherein each of the first and second clock signals has a frequency being substantially a frequency of the input clock signal divided by 2N+1, where N is an integer include any of the tri-state ring oscillators, 2N+1 modulo counters, duty cycle control circuits, and jitter control circuits described herein.

The method 1100 further includes performing a logic operation on the first and second clock signals to generate an output clock signal with a frequency being substantially the frequency of the input clock signal divided by NP5, where P5 is a half fraction (block 1120). Examples of means for performing a logic operation on the first and second clock signals to generate an output clock signal with a frequency being substantially the frequency of the input clock signal divided by NP5, where P5 is a half fraction include any of the logic circuits configured to perform an exclusive-OR or equivalent logic operation described herein.

The method 1100 may include: generating a set of clock signals, each having a frequency being substantially the frequency of the input clock signal divided by 2N+1, wherein the set of clock signals are separated from each other in phase by substantially one (1) clock cycle of the input clock signal, respectively; and outputting two of the clock signals with a phase difference with respect to each other of substantially (N+1)/2 cycles of the input clock signal if N is odd or substantially N/2 cycles of the input clock signal if N is even, wherein the first and second clock signals are based on the outputted two clock signals. Examples of means for generating the set of clock signals and means for outputting two of the clock signals include any of the tri-state ring oscillators described herein.

The method 1100 may include generating a set of m+1 clock signals sequentially numbered from zero (0) to m, wherein $2^{m+1}$ is greater than 2N+1; and generating a shifted clock signal based on the $(m-1)^{th}$ clock signal and the $m^{th}$ clock signal, wherein a phase difference between the $m^{th}$ clock signal and the shifted clock signal is substantially (N+1)/2 cycles of the input clock signal if N is odd or substantially N/2 cycles of the input clock signal if N is even, wherein the first and second clock signals are based on the $m^{th}$ clock signal and the shifted clock signal, respectively. Examples of means for generating a set of m+1 clock signals include any of the 2N+1 modulo counters described herein, and examples of means for generating a shifted clock signal include any of the jitter control circuits (e.g., flip-flops) described herein.

The following provides an overview of aspects of the present disclosure:

Aspect 1: An apparatus, comprising: a clock source configured to generate first and second clock signals based on an input clock signal, wherein each of the first and second clock signals has a frequency being substantially a frequency of the input clock signal divided by 2N+1, where N is an integer; and a logic gate configured to perform a logic operation on the first and second clock signals to generate an output clock signal with a frequency being substantially the frequency of the input clock signal divided by NP5, where P5 is a half fraction.

Aspect 2: The apparatus of aspect 1, wherein the clock source comprises a tri-state ring oscillator configured to generate a first set of one or more clock signals, wherein the first and second clock signals are based on the first set of one or more clock signals.

Aspect 3: The apparatus of aspect 2, wherein the first set of one or more clock signals each have a duty cycle of substantially N/(2N+1) or (N+1)/(2N+1).

Aspect 4: The apparatus of aspect 3, wherein the first and second clock signals each have a duty cycle of substantially 50 percent.

Aspect 5: The apparatus of aspect 4, further comprising a duty cycle control circuit configured to generate the first and second clock signals based on the first set of one or more clock signals.

Aspect 6: The apparatus of aspect 5, wherein the first set of one or more clock signals includes third and fourth clock signals, and wherein the duty cycle control circuit comprises: a first negative latch including a data input configured to receive the third clock signal, a clock input configured to receive the input clock signal, and a data output configured to generate a fifth clock signal being shifted with respect to the third clock signal by substantially a half cycle of the input clock signal; a second negative latch including a data input configured to receive the fourth clock signal, a clock input configured to receive the input clock signal, and a data output configured to generate a sixth clock signal being shifted with respect to the fourth clock signal by substantially a half cycle of the input clock signal; a first logic gate configured to generate the first clock signal by performing a first logic operation on the third and fifth clock signals; and a second logic gate configured to generate the second clock signal by performing a second logic operation on the fourth and sixth clock signals.

Aspect 7: The apparatus of any one of aspects 2-6, wherein the clock source further comprises a jitter control circuit configured to generate a second set of one or more clock signals based on the first set of one or more clock signals, wherein the first and second clock signals are based on the second set of one or more clock signals.

Aspect 8: The apparatus of aspect 7, wherein the first set of one or more clock signals includes third and fourth clock signals, wherein the second set of one or more clock signal includes fifth and sixth clock signals, and wherein the jitter control circuit comprises: a first set of one or more cascaded flip-flops including a data input configured to receive the third clock signal, one or more clock inputs configured to receive the input clock signal, and a data output configured to output the fifth clock signal; and a second set of one or more cascaded flip-flops including a data input configured to receive the fourth clock signal, one or more clock inputs configured to receive the input clock signal, and a data output configured to output the sixth clock signal.

Aspect 9: The apparatus of any one of aspects 1-8, wherein the clock source comprises a tri-state ring oscillator comprising: a set of N+1 cascaded flip-flops including respective clock inputs configured to receive the input clock signal; and an inverting multiplexer including a first input coupled to a data output of the $(N-1)^{th}$ cascaded flip-flop, a second input coupled to a data output of the $N^{th}$ cascaded flip-flop, an output coupled to a data input of the $0^{th}$ cascaded flip-flop, and a select input coupled to a data output of the $((N-1)/2)^{th}$ cascaded flip-flop if N is odd or the $(N/2)^{th}$ cascaded flip-flop if N is even; wherein the first clock signal is based on a clock signal at the data output of the $((N-1)/2)^{th}$ cascaded flip-flop if N is odd or the $(N/2)^{th}$ cascaded flip-flop if N is even; and wherein the second clock signal is based on a clock signal at the data output of the $N^{th}$ cascaded flip-flop.

Aspect 10: The apparatus of aspect 9, wherein the inverting multiplexer comprises: a first tri-state inverter including an input coupled to the data output of the $(N-1)^{th}$ cascaded flip-flop, and an output coupled to the data input of the $0^{th}$ cascaded flip-flop, and an enable input coupled to the data output of the $((N-1)/2)^{th}$ cascaded flip-flop if N is odd or the $(N/2)^{th}$ cascaded flip-flop if N is even; and a second tri-state inverter including an input coupled to the data output of the $N^{th}$ cascaded flip-flop, and an output coupled to the data input of the $0^{th}$ cascaded flip-flop, and an enable input coupled to the data output of the $((N-1)/2)^{th}$ cascaded flip-flop if N is odd or the $(N/2)^{th}$ cascaded flip-flop if N is even.

Aspect 11: The apparatus of aspect 10, wherein the tri-state ring oscillator further comprises: a first inverter including an input coupled to the data output of the $((N-1)/2)^{th}$ cascaded flip-flop if N is odd or the $(N/2)^{th}$ cascaded flip-flop if N is even; and a second inverter including an input coupled to an output of the first inverter; wherein the enable input of the first tri-state inverter includes a non-complementary enable input coupled to an output of the second inverter, and a complementary enable input coupled to the output of the first inverter; and wherein the enable input of the second tri-state inverter includes a non-complementary enable input coupled to the output of the first inverter, and a complementary enable input coupled to the output of the second inverter.

Aspect 12: The apparatus of aspect 1, wherein the clock source comprises a 2N+1 modulo counter configured to generate a first set of m+1 clock signals sequentially numbered from zero (0) to m, wherein $2^{m+1}$ is greater than 2N+1, wherein the first and second clock signals are based on the $m^{th}$ clock signal.

Aspect 13: The apparatus of aspect 12, wherein the 2N+1 modulo counter comprises: a set of m+1 combinational logic circuits, each including inputs configured to receive and perform a logic operation on the first set of m+1 clock signals, to generate a second set of m+1 clock signals, respectively; and a set of m+1 flip-flops including: data inputs configured to receive the second set of m+1 clock signals, respectively; data outputs configured to generate the first set of m+1 clock signals, respectively; and clock inputs configured to receive the input clock signal.

Aspect 14: The apparatus of aspect 12 or 13, wherein the clock source comprises a shifted clock signal generator configured to generate a shifted clock signal based on the $(m-1)^{th}$ and $m^{th}$ clock signals, wherein a phase difference between the shifted clock signal and the $m^{th}$ clock signal is substantially (N+1)/2 cycles of the input clock signal if N is odd or N/2 cycles of the input clock signal if N is even, wherein the first and second clock signals are based on the $m^{th}$ and shifted clock signals, respectively.

Aspect 15: The apparatus of aspect 14, wherein the shifted clock signal generator comprises a flip-flop including a data input configured to receive the $m^{th}$ clock signal, a clock input configured to receive the $(m-1)^{th}$ clock signal, and an output configured to output the shifted clock signal.

Aspect 16: The apparatus of aspect 15, wherein the $m^{th}$ clock signal and the shifted clock signal each have a duty cycle of substantially N/(2N+1) or (N+1)/(2N+1).

Aspect 17: The apparatus of aspect 16, further comprising a duty cycle control circuit configured to generate the first and second clock signals based on the first set of one or more clock signals, wherein the first and second clock signals each have a substantially 50 percent duty cycle.

Aspect 18: The apparatus of any one of aspects 15-17, wherein the clock source further comprises a jitter control circuit configured to generate third and fourth clock signals based on the $m^{th}$ clock signal and the shifted clock signal, respectively, wherein the first and second clock signals are based on the third and fourth clock signals, respectively.

Aspect 19: The apparatus of any one of aspects 1-18, wherein the logic circuit comprises an exclusive-OR (XOR) gate.

Aspect 20: A method, comprising: generating first and second clock signals based on an input clock signal, wherein each of the first and second clock signals has a frequency being substantially a frequency of the input clock signal divided by 2N+1, where N is an integer; and performing a logic operation on the first and second clock signals to generate an output clock signal with a frequency being substantially the frequency of the input clock signal divided by NP5, where P5 is a half fraction.

Aspect 21: The method of aspect 20, wherein generating the first and second clock signals comprises: generating a set of clock signals, each having a frequency being substantially the frequency of the input clock signal divided by 2N+1, wherein the set of clock signals are separated from each other in phase by substantially one (1) cycle of the input clock signal, respectively; and outputting two of the clock signals with a phase difference with respect to each other of substantially (N+1)/2 cycles of the input clock signal if N is odd or substantially N/2 cycles of the input clock signal if N is even, wherein the first and second clock signals are based on the outputted two clock signals.

Aspect 22: The method of aspect 20, wherein generating the first and second clock signals comprises: generating a set of m+1 clock signals sequentially numbered from zero (0) to m, wherein $2^{m+1}$ is greater than 2N+1; and generating a shifted clock signal based on the $(m-1)^{th}$ clock signal and the $m^{th}$ clock signal, wherein a phase difference between the $m^{th}$ clock signal and the shifted clock signal is substantially (N+1)/2 cycles of the input clock signal if N is odd or substantially N/2 cycles of the input clock signal if N is even, wherein the first and second clock signals are based on the $m^{th}$ clock signal and the shifted clock signal, respectively.

Aspect 23: The method of any one of aspects 20-22, wherein the first and second clock signals each have a duty cycle of substantially 50 percent, and wherein the first and second clock signals are based on third and fourth clock signals each having a duty cycle of substantially N/(2N+1) or (N+1)/(2N+1).

Aspect 24: The method of any one of aspects 20-23, wherein performing the logic operation comprises performing an exclusive-OR (XOR) operation on the first and second clock signals to generate the output clock signal.

Aspect 25: An apparatus, comprising: means for generating first and second clock signals based on an input clock signal, wherein each of the first and second clock signals has a frequency being substantially a frequency of the input clock signal divided by 2N+1, where N is an integer; and means for performing a logic operation on the first and second clock signals to generate an output clock signal with a frequency being substantially the frequency of the input clock signal divided by NP5, where P5 is a half fraction.

Aspect 26: An apparatus, comprising: a clock source including an input configured to generate first and second clock signals based on an input clock signal; and a logic circuit including first and second inputs coupled to first and second outputs of the clock source, respectively, and an output configured to generate an output clock signal with a frequency being substantially a frequency of the input clock signal divided by NP5, where N is an integer and P5 is a half fraction.

Aspect 27: The apparatus of aspect 26, wherein the clock source comprises a tri-state ring oscillator.

Aspect 28: The apparatus of aspect 26, wherein the clock source comprises a counter.

Aspect 29: The apparatus of any one of aspects 26-28, wherein the logic circuit comprises an exclusive-OR (XOR) gate.

Aspect 30: The apparatus of any one of aspects 26-29, further comprising a duty cycle control circuit including first and second inputs coupled to the first and second outputs of the clock source, respectively, and first and second outputs coupled to the first and second inputs of the logic circuit, respectively.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed:

1. An apparatus, comprising:
    a clock source configured to generate first and second clock signals based on an input clock signal, wherein each of the first and second clock signals has a frequency being substantially a frequency of the input clock signal divided by 2N+1, where N is an integer; and
    a logic circuit configured to perform a logic operation on the first and second clock signals to generate an output clock signal with a frequency being substantially the frequency of the input clock signal divided by NP5, where P5 is a half fraction;
    wherein the clock source comprises a tri-state ring oscillator configured to generate a first set of one or more clock signals, wherein the first and second clock signals are based on the first set of one or more clock signals;
    the apparatus further comprising a duty cycle control circuit configured to generate the first and second clock signals based on the first set of one or more clock signals;
    wherein the first set of one or more clock signals includes third and fourth clock signals, and wherein the duty cycle control circuit comprises:
        a first negative latch including a data input configured to receive the third clock signal, a clock input configured to receive the input clock signal, and a data output configured to generate a fifth clock signal being shifted with respect to the third clock signal by substantially a half cycle of the input clock signal;
        a second negative latch including a data input configured to receive the fourth clock signal, a clock input configured to receive the input clock signal, and a data output configured to generate a sixth clock signal being shifted with respect to the fourth clock signal by substantially a half cycle of the input clock signal;
        a first logic gate configured to generate the first clock signal by performing a first logic operation on the third and fifth clock signals; and
        a second logic gate configured to generate the second clock signal by performing a second logic operation on the fourth and sixth clock signals.

2. The apparatus of claim 1, wherein the first set of one or more clock signals each have a duty cycle of substantially N/(2N+1).

3. The apparatus of claim 2, wherein the first and second clock signals each have a duty cycle of substantially 50 percent.

4. The apparatus of claim 1, wherein the clock source further comprises a jitter control circuit configured to generate a second set of one or more clock signals based on the first set of one or more clock signals, wherein the first and second clock signals are based on the second set of one or more clock signals.

5. The apparatus of claim 4, wherein the first set of one or more clock signals includes third and fourth clock signals, wherein the second set of one or more clock signal includes fifth and sixth clock signals, and wherein the jitter control circuit comprises:
    a first set of one or more cascaded flip-flops including a data input configured to receive the third clock signal, one or more clock inputs configured to receive the input clock signal, and a data output configured to output the fifth clock signal; and a second set of one or more cascaded flip-flops including a data input configured to receive the fourth clock signal, one or more clock inputs configured to receive the input clock signal, and a data output configured to output the sixth clock signal.

6. The apparatus of claim 1, wherein the logic circuit comprises an exclusive-OR (XOR) gate.

7. An apparatus, comprising:
a clock source configured to generate first and second clock signals based on an input clock signal, wherein each of the first and second clock signals has a frequency being substantially a frequency of the input clock signal divided by 2N+1, where N is an integer; and a logic circuit configured to perform a logic operation on the first and second clock signals to generate an output clock signal with a frequency being substantially the frequency of the input clock signal divided by NP5, where P5 is a half fraction;

wherein the clock source comprises a tri-state ring oscillator comprising:
a set of N+1 cascaded flip-flops including respective clock inputs configured to receive the input clock signal; and
an inverting multiplexer including a first input coupled to a data output of the $(N-1)^{th}$ cascaded flip-flop, a second input coupled to a data output of the $N^{th}$ cascaded flip-flop, an output coupled to a data input of the $0^{th}$ cascaded flip-flop, and a select input coupled to a data output of the $((N-1)/2)^{th}$ cascaded flip-flop if N is odd or the $(N/2)^{th}$ cascaded flip-flop if N is even;
wherein the first clock signal is based on a clock signal at the data output of the $((N-1)/2)^{th}$ cascaded flip-flop if N is odd or the $(N/2)^{th}$ cascaded flip-flop if N is even; and
wherein the second clock signal is based on a clock signal at the data output of the $N^{th}$ cascaded flip-flop.

8. The apparatus of claim 7, wherein the inverting multiplexer comprises:
a first tri-state inverter including an input coupled to the data output of the $(N-1)^{th}$ cascaded flip-flop, and an output coupled to the data input of the $0^{th}$ cascaded flip-flop, and an enable input coupled to the data output of the $((N-1)/2)^{th}$ cascaded flip-flop if N is odd or the $(N/2)^{th}$ cascaded flip-flop if N is even; and
a second tri-state inverter including an input coupled to the data output of the $N^{th}$ cascaded flip-flop, and an output coupled to the data input of the $0^{th}$ cascaded flip-flop, and an enable input coupled to the data output of the $((N-1)/2)^{th}$ cascaded flip-flop if N is odd or the $(N/2)^{th}$ cascaded flip-flop if N is even.

9. The apparatus of claim 8, wherein the tri-state ring oscillator further comprises:
a first inverter including an input coupled to the data output of the $((N-1)/2)^{th}$ cascaded flip-flop if N is odd or the $(N/2)^{th}$ cascaded flip-flop if N is even; and
a second inverter including an input coupled to an output of the first inverter;
wherein the enable input of the first tri-state inverter includes a non-complementary enable input coupled to an output of the second inverter, and a complementary enable input coupled to the output of the first inverter; and
wherein the enable input of the second tri-state inverter includes a non-complementary enable input coupled to the output of the first inverter, and a complementary enable input coupled to the output of the second inverter.

10. An apparatus, comprising:
a clock source configured to generate first and second clock signals based on an input clock signal, wherein each of the first and second clock signals has a frequency being substantially a frequency of the input clock signal divided by 2N+1, where N is an integer; and a logic circuit configured to perform a logic operation on the first and second clock signals to generate an output clock signal with a frequency being substantially the frequency of the input clock signal divided by NP5, where P5 is a half fraction;

wherein the clock source comprises a 2N modulo counter configured to generate a first set of m+1 clock signals sequentially numbered from zero (0) to m, wherein $2^{m+1}$ is greater than 2N+1, wherein the first and second clock signals are based on the $m^{th}$ clock signal;
wherein the 2N modulo counter comprises:
a set of m+1 combinational logic circuits, each including inputs configured to receive and perform a logic operation on the first set of m+1 clock signals, to generate a second set of m+1 clock signals, respectively; and
a set of m+1 flip-flops including: data inputs configured to receive the second set of m+1 clock signals, respectively; data outputs configured to generate the first set of m+1 clock signals, respectively; and clock inputs configured to receive the input clock signal.

11. An apparatus, comprising:
a clock source configured to generate first and second clock signals based on an input clock signal, wherein each of the first and second clock signals has a frequency being substantially a frequency of the input clock signal divided by 2N+1, where N is an integer; and a logic circuit configured to perform a logic operation on the first and second clock signals to generate an output clock signal with a frequency being substantially the frequency of the input clock signal divided by NP5, where P5 is a half fraction;

wherein the clock source comprises a 2N modulo counter configured to generate a first set of m+1 clock signals sequentially numbered from zero (0) to m, wherein $2^{m+1}$ is greater than 2N+1, wherein the first and second clock signals are based on the $m^{th}$ clock signal;
wherein the clock source comprises a shifted clock signal generator configured to generate a shifted clock signal based on the $(m-1)^{th}$ and $m^{th}$ clock signals, wherein a phase difference between the shifted clock signal and the $m^{th}$ clock signal is substantially (N+1)/2 cycles of the input clock signal if N is odd or N/2 cycles of the input clock signal if N is even, wherein the first and second clock signals are based on the $m^{th}$ and shifted clock signals, respectively.

12. The apparatus of claim 11, wherein the shifted clock signal generator comprises a flip-flop including a data input configured to receive the $m^{th}$ clock signal, a clock input configured to receive the $(m-1)^{th}$ clock signal, and an output configured to output the shifted clock signal.

13. The apparatus of claim 12, wherein the $m^{th}$ clock signal and the shifted clock signal each have a duty cycle of substantially N/(2N+1).

14. The apparatus of claim 13, further comprising a duty cycle control circuit configured to generate the first and second clock signals based on the $m^{th}$ clock signal and the shifted clock signal, respectively, wherein the first and second clock signals each have a substantially 50 percent duty cycle.

15. The apparatus of claim 12, wherein the clock source further comprises a jitter control circuit configured to generate third and fourth clock signals based on the $m^{th}$ clock signal and the shifted clock signal, respectively, wherein the first and second clock signals are based on the third and fourth clock signals, respectively.

16. A method, comprising:
generating first and second clock signals based on an input clock signal, wherein each of the first and second clock signals has a frequency being substantially a frequency of the input clock signal divided by 2N+1, where N is an integer; and
performing a logic operation on the first and second clock signals to generate an output clock signal with a frequency being substantially the frequency of the input clock signal divided by NP5, where P5 is a half fraction;
wherein generating the first and second clock signals comprises:
generating a set of m+1 clock signals sequentially numbered from zero (0) to m, wherein $2^{m+1}$ is greater than 2N+1; and
generating a shifted clock signal based on the $(m-1)^{th}$ clock signal and the $m^{th}$ clock signal, wherein a phase difference between the $m^{th}$ clock signal and the shifted clock signal is substantially (N+1)/2 cycles of the input clock signal if N is odd or substantially N/2 cycles of the input clock signal if N is even, wherein the first and second clock signals are based on the $m^{th}$ clock signal and the shifted clock signal, respectively.

17. The method of claim 16, wherein the first and second clock signals each have a duty cycle of substantially 50 percent, and wherein the first and second clock signals are based on third and fourth clock signals each having a duty cycle of N/(2N+1).

18. The method of claim 16, wherein performing the logic operation comprises performing an exclusive-OR (XOR) operation on the first and second clock signals to generate the output clock signal.

19. An apparatus, comprising:
means for generating first and second clock signals based on an input clock signal, wherein each of the first and second clock signals has a frequency being substantially a frequency of the input clock signal divided by 2N+1, where N is an integer; and
means for performing a logic operation on the first and second clock signals to generate an output clock signal with a frequency being substantially the frequency of the input clock signal divided by NP5, where P5 is a half fraction;
wherein the means for generating the first and second clock signals is configured to:
generate a set of m+1 clock signals sequentially numbered from zero (0) to m, wherein $2^{m+1}$ is greater than 2N+1; and
generate a shifted clock signal based on the $(m-1)^{th}$ clock signal and the $m^{th}$ clock signal, wherein a phase difference between the $m^{th}$ clock signal and the shifted clock signal is substantially (N+1)/2 cycles of the input clock signal if N is odd or substantially N/2 cycles of the input clock signal if N is even, wherein the first and second clock signals are based on the $m^{th}$ clock signal and the shifted clock signal, respectively.

20. An apparatus, comprising:
a clock source including an input configured to generate first and second clock signals based on an input clock signal, wherein each of the first and second clock signals has a frequency being substantially a frequency of the input clock signal divided by 2N+1, where N is an integer; and
a logic circuit including first and second inputs coupled to first and second outputs of the clock source, respectively, and an output configured to generate an output clock signal with a frequency being substantially a frequency of the input clock signal divided by NP5, where N is an integer and P5 is a half fraction;
wherein the clock source is configured to:
generate a set of m+1 clock signals sequentially numbered from zero (0) to m, wherein $2^{m+1}$ is greater than 2N+1; and
generate a shifted clock signal based on the $(m-1)^{th}$ clock signal and the $m^{th}$ clock signal, wherein a phase difference between the $m^{th}$ clock signal and the shifted clock signal is substantially (N+1)/2 cycles of the input clock signal if N is odd or substantially N/2 cycles of the input clock signal if N is even, wherein the first and second clock signals are based on the $m^{th}$ clock signal and the shifted clock signal, respectively.

21. The apparatus of claim 20, wherein the clock source comprises a tri-state ring oscillator.

22. The apparatus of claim 20, wherein the clock source comprises a counter.

23. The apparatus of claim 20, wherein the logic circuit comprises an exclusive-OR (XOR) gate.

24. The apparatus of claim 20, further comprising a duty cycle control circuit including first and second inputs coupled to the first and second outputs of the clock source, respectively, and first and second outputs coupled to the first and second inputs of the logic circuit, respectively.

* * * * *